(12) United States Patent
Ma et al.

(10) Patent No.: US 9,313,322 B2
(45) Date of Patent: Apr. 12, 2016

(54) METHOD AND APPARATUS FOR INCREMENTALLY DETERMINING LOCATION CONTEXT

(71) Applicant: NOKIA TECHNOLOGIES OY, Espoo (FI)

(72) Inventors: Yiming Ma, Fremont, CA (US); Rich Hankins, San Jose, CA (US); David Racz, Palo Alto, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/744,949

(22) Filed: Jun. 19, 2015

(65) Prior Publication Data

US 2015/0288805 A1     Oct. 8, 2015

Related U.S. Application Data

(60) Continuation of application No. 14/218,477, filed on Mar. 18, 2014, now abandoned, which is a division of application No. 12/565,573, filed on Sep. 23, 2009, now Pat. No. 8,737,961.

(51) Int. Cl.
    *H04M 1/66*          (2006.01)
    *H04M 1/725*        (2006.01)
    (Continued)

(52) U.S. Cl.
    CPC ........... *H04M 1/72577* (2013.01); *H04L 67/18* (2013.01); *H04M 1/72572* (2013.01);
    (Continued)

(58) Field of Classification Search
    CPC ... H04L 65/4015; H04L 67/148; H04L 69/14; H04L 65/1069; H04W 36/0016; H04W 76/025; H04W 36/18; H04W 24/04; H04W 36/0083; H04W 36/30; H04W 48/18; H04W 24/02; H04W 28/26; H04W 36/0022
    USPC ......................................................... 455/410
See application file for complete search history.

(56) References Cited

U.S. PATENT DOCUMENTS 5,835,061 A    11/1998   Stewart
6,414,635 B1    7/2002   Stewart et al.
(Continued)

FOREIGN PATENT DOCUMENTS

GB          2348777 A    10/2000

OTHER PUBLICATIONS

Chinese Office Action for related Chinese Patent Application No. 201080042213.0 dated Mar. 5, 2014, with English-language summary, 9 pages.
International Search Report and Written Opinion for corresponding International Application No. PCT/FI2010/050655 dated Dec. 28, 2010, pp. 1-12.
(Continued)

*Primary Examiner* — Kwasi Karikari
(74) *Attorney, Agent, or Firm* — Ditthavong & Steiner, P.C.

(57) ABSTRACT

Techniques to derive or predict location context for a user of a mobile device include receiving signal data that indicates a set of one or more distinct signal sources from which signals are received at the mobile device for each of multiple different times. The method further comprises determining whether the mobile device is moving outside a specified area at a current time based on the signal data. The method further comprises incrementing a count for a stationary state associated with the set of one or more distinct signal sources at the current time, if the mobile device is determined to be not moving outside the specified area. The method also comprises delivering a service to the mobile device based on the stationary state.

17 Claims, 23 Drawing Sheets

(51) Int. Cl.
*H04W 4/02* (2009.01)
*H04L 29/08* (2006.01)
*H04W 12/08* (2009.01)
*H04W 48/04* (2009.01)
*H04W 4/00* (2009.01)
*H04W 64/00* (2009.01)

(52) U.S. Cl.
CPC ............... *H04W 4/02* (2013.01); *H04W 4/021* (2013.01); *H04W 12/08* (2013.01); *H04W 48/04* (2013.01); *H04W 4/001* (2013.01); *H04W 4/027* (2013.01); *H04W 64/00* (2013.01)

(56) References Cited

U.S. PATENT DOCUMENTS

| | | | |
|---|---|---|---|
| 7,065,446 | B2 | 6/2006 | Chou |
| 7,096,030 | B2 | 8/2006 | Huomo |
| 7,263,441 | B1 | 8/2007 | Janky et al. |
| 2002/0055842 | A1 | 5/2002 | Miyazawa |
| 2003/0006911 | A1* | 1/2003 | Smith ............... G06Q 30/02 340/988 |
| 2003/0014491 | A1 | 1/2003 | Horvitz et al. |
| 2003/0182394 | A1 | 9/2003 | Ryngler et al. |
| 2006/0160540 | A1 | 7/2006 | Strutt et al. |
| 2007/0033044 | A1 | 2/2007 | Yao |
| 2008/0102836 | A1 | 5/2008 | Wang et al. |
| 2008/0227463 | A1 | 9/2008 | Hizume et al. |
| 2008/0233945 | A1* | 9/2008 | Gummadi ........... H04W 52/282 455/422.1 |
| 2008/0248815 | A1 | 10/2008 | Busch |
| 2009/0089166 | A1 | 4/2009 | Happonen |

OTHER PUBLICATIONS

Chinese Office Action for related Chinese Patent Application No. 201080042213.0 dated Aug. 26, 2014, with English-language summary, 4 Pages.
Blei et al., "Latent Dirichlet Allocation", Journal of Machine Learning Research, vol. 3, Mar. 1, 2003, retrieved from https://www.cs.princeton.edu/~blei/papers/BleiNgJordan2003.pdf, pp. 993-1022.
Chen et al., "Practical Metropolitan-Scale Positioning for GSM Phones", 8th International Conference on Ubiquitous Computing, vol. 4206, Sep. 17-21, 2006, retrieved from http://citeseerx.ist.psu.edu/viewdoc/download?doi=10.1.1.84.9148&rep=rep1&type=pdf, pp. 225-242.
Hightower et al., "Learning and Recognizing the Places We Go", 7th International Conference on Ubiquitous Computing, vol. 3660, Sep. 11-14, 2005, retrieved on Sep. 22, 2015 from http://luci.ics.uci.edu/websiteContent/weAreLuci/biographies/faculty/djp3/LocalCopy/learningWeGo.pdf, pp. 159-176.
Otsason et al., "Accurate GSM Indoor Localization", 7th International Conference on Ubiquitous Computing, vol. 3660, Sep. 11-14, 2005, retrieved on Sep. 22, 2015 from https://homes.cs.washington.edu/~lamarca/pubs/ubicomp.pdf, pp. 141-158.
Schwaighofer et al., "GPPS: A Gaussian Process Positioning System for Cellular Networks", Advances in Neural Information Processing Systems 16, Dec. 8-13, 2003, retrieved on Sep. 22, 2015 from http://research.microsoft.com/pubs/74491/nips03_localization.pdf, 8 Pages.
Walker et al., "Model-Based Document Clustering with a Collapsed Gibbs Sampler", 14th ACM SIGKDD International Conference on Knowledge Discovery and Data Mining, Aug. 24-27, 2008, retrieved on Sep. 22, 2015 from https://faculty.cs.byu.edu/~ringger/CS679/papers/WalkerRingger-Gibbs-kdd2008.pdf, 9 Pages.

* cited by examiner

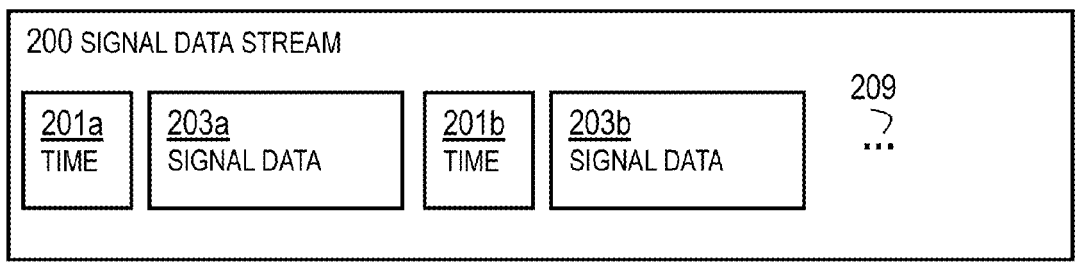
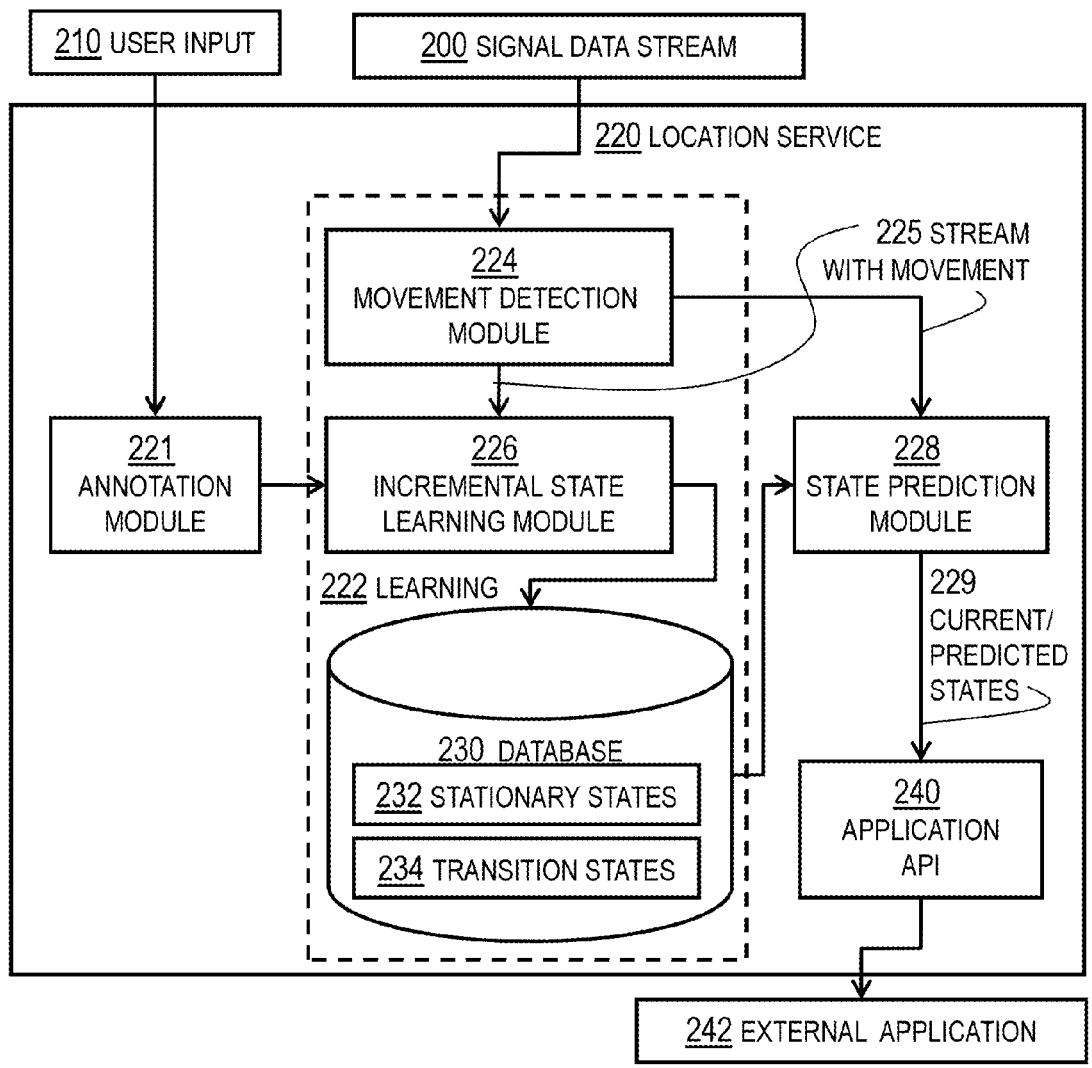

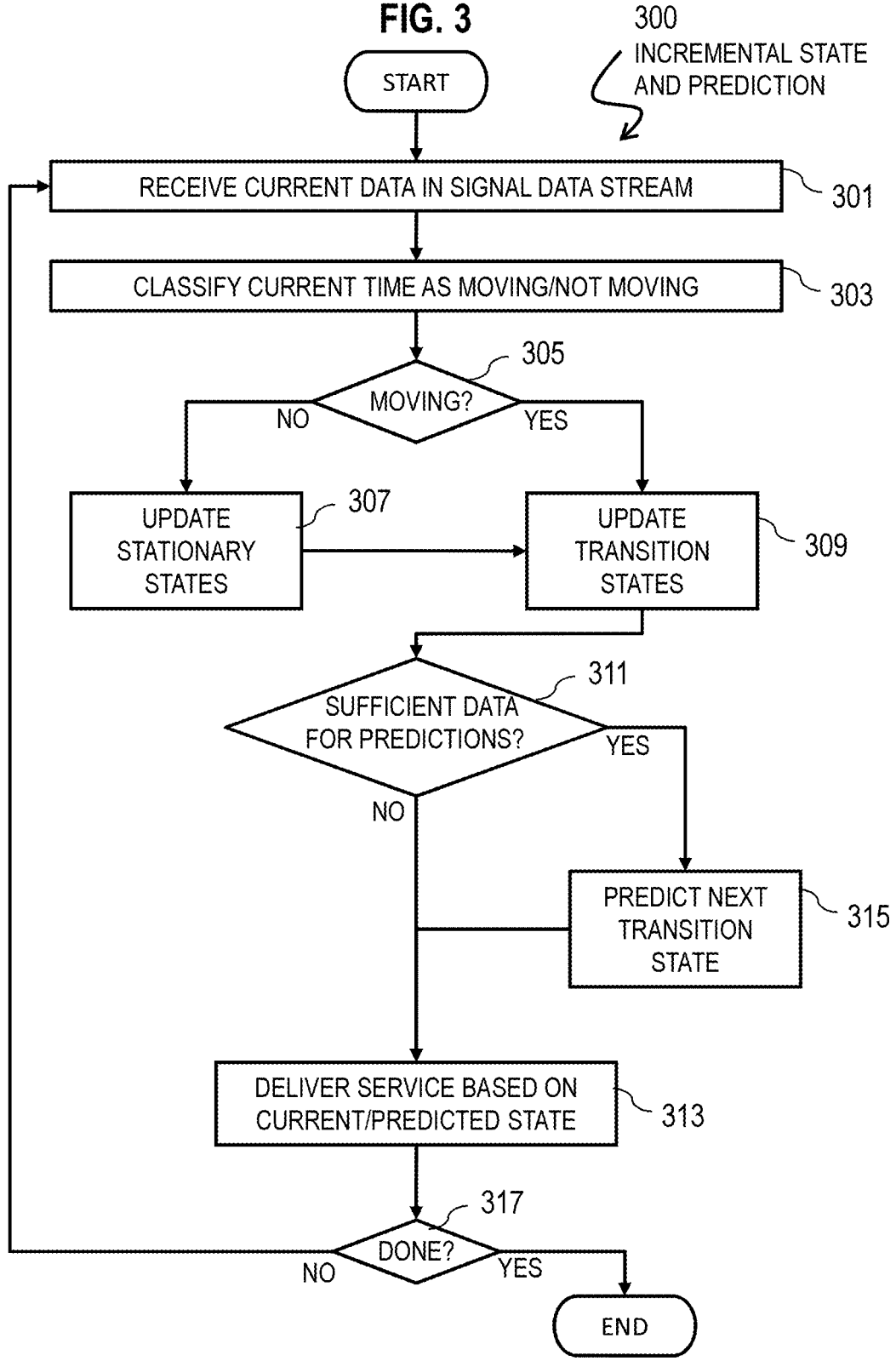

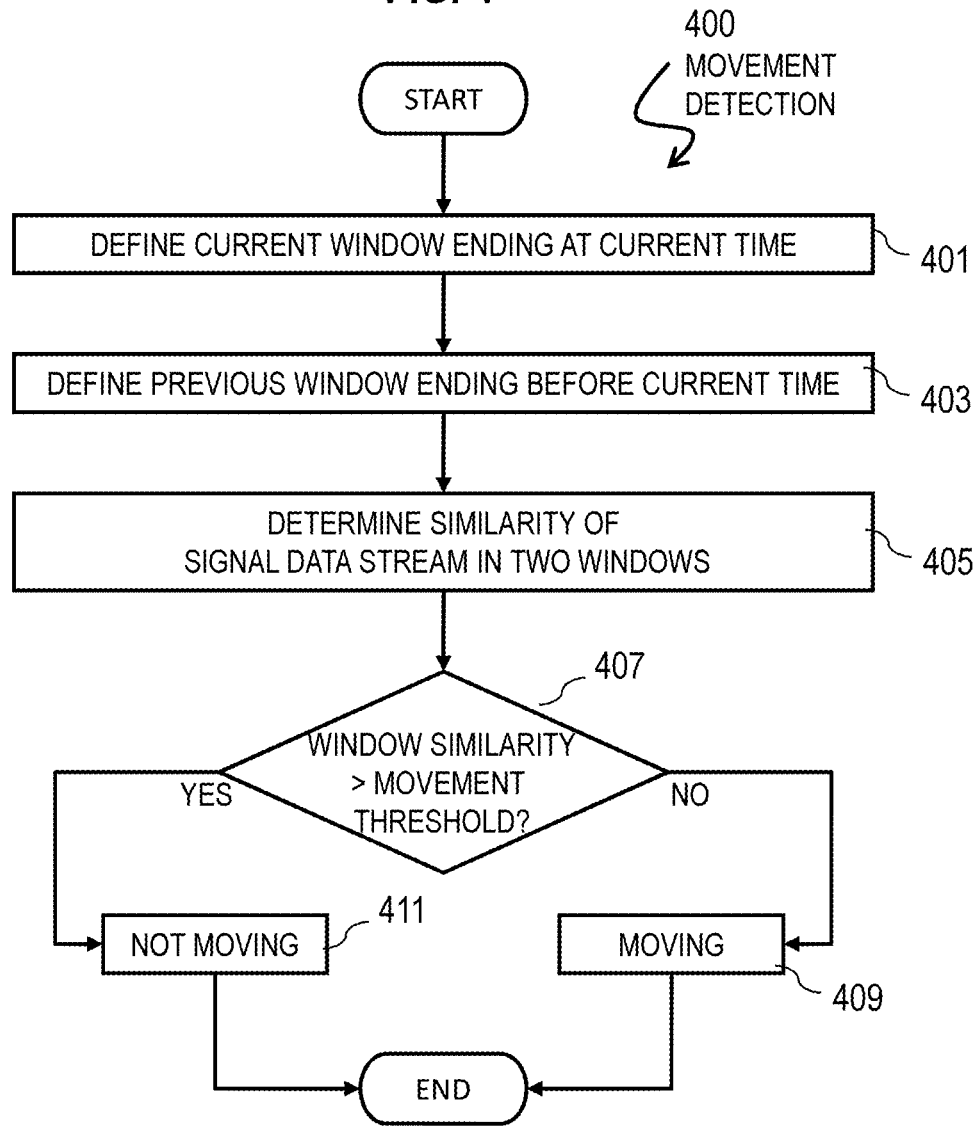

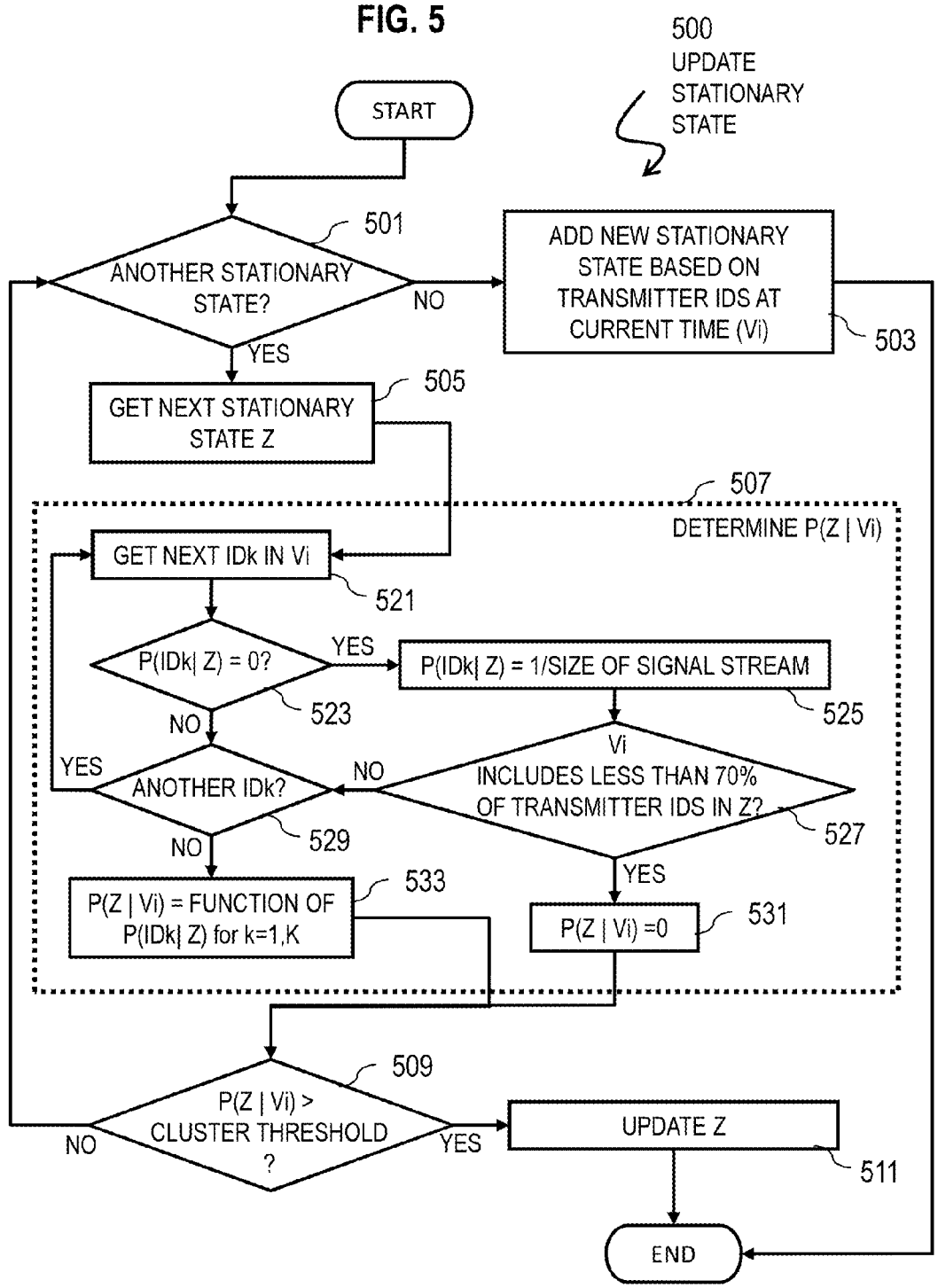

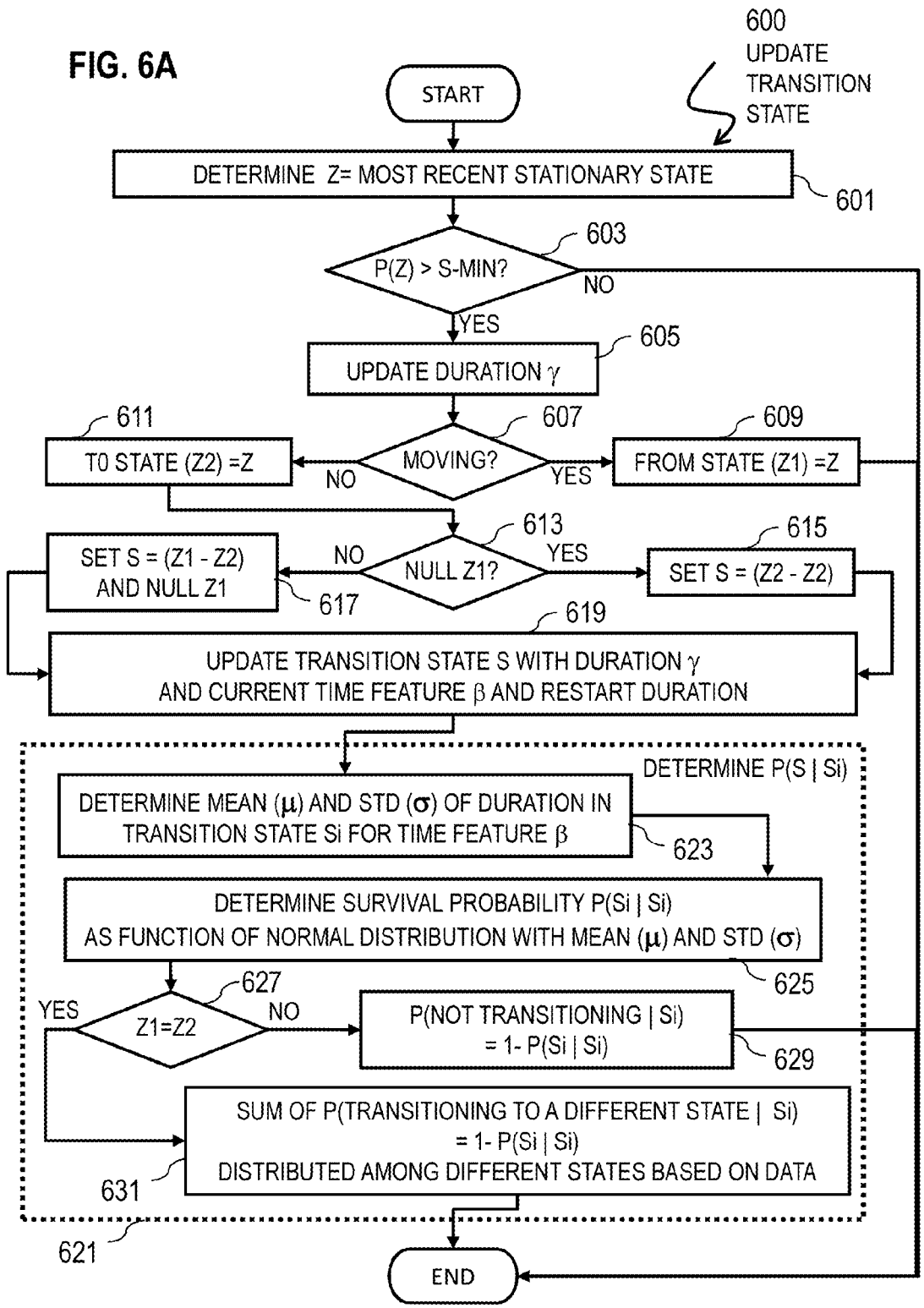

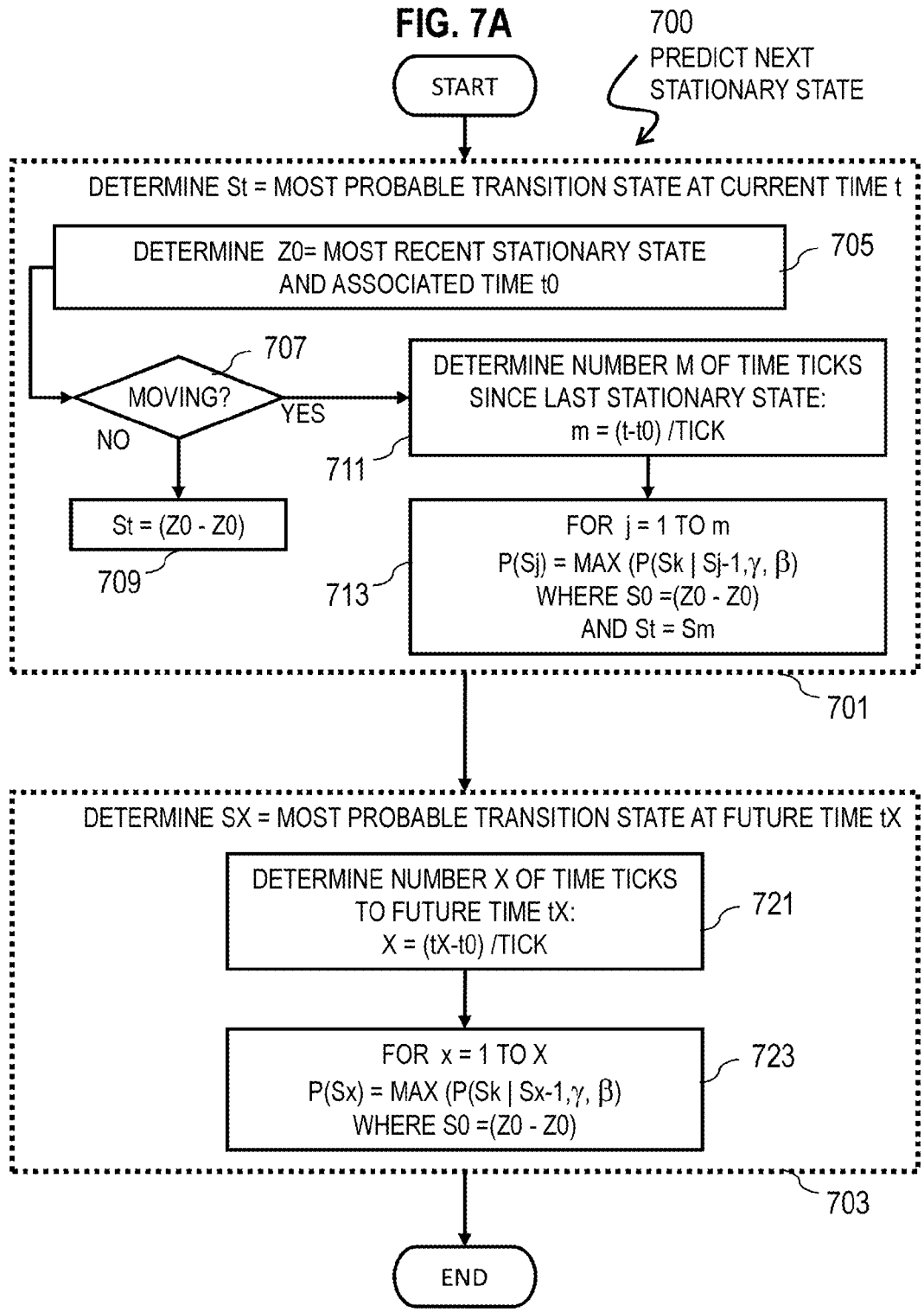

FIG. 8A
800
LOCATION
CONTEXT
CLIENT
DATA
FIG. 8B
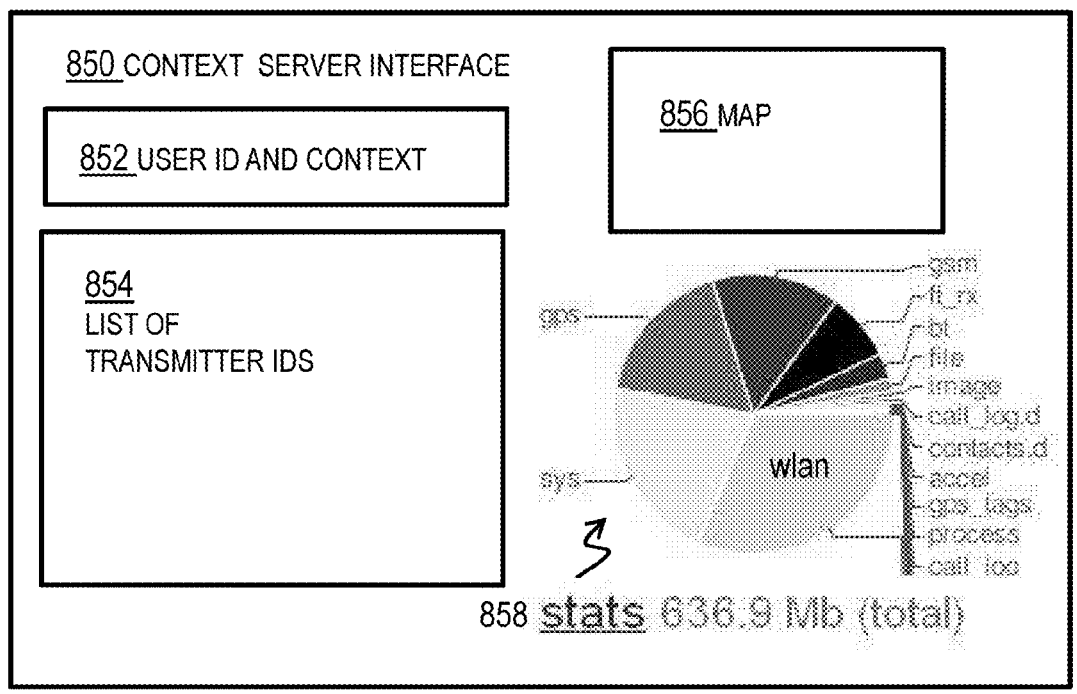

METHOD AND APPARATUS FOR INCREMENTALLY DETERMINING LOCATION CONTEXT

RELATED APPLICATIONS

This application is a continuation of U.S. patent application Ser. No. 14/218,477, filed Mar. 18, 2014 which is division of U.S. patent application Ser. No. 12/565,573, tiled "Method and Apparatus for incrementally Determining Location Context," filed Sep. 23, 2009, which is incorporated herein in its entirety.

BACKGROUND

Service providers (e.g., wireless, cellular, etc.) and device manufacturers are continually challenged to deliver value and convenience to consumers by, for example, providing compelling network services. A popular application is delivering services to a user of a wireless device based on the device's location, and many mobile devices include Global Positioning System (GPS) receivers that provide geolocation of the device to about 30 meter accuracy. While suitable for many purposes, there are problems delivering services based on GPS data. One problem is that the power consumption in continuously monitoring on-device GPS is high. It is still not possible for most of the mobile phones to continuously trace a user for more than a relatively short period (e.g., 3 hours) without charging. A second problem is that the storage cost for storing GPS traces is also high. A third problem is that it is still not efficient and effective to derive a context for a user, e.g., at or near a usual spot (such as café, gym, work or home) based on determining similarity of different GPS traces. It is desirable to derive context, such as "work" or "lunch" or "recreation," to be used to tailor network services. However, current techniques for deriving location context from geolocation data are computationally intensive and do not scale well to thousands of users of the service.

Some Example Embodiments

Therefore, there is a need for an approach to derive or predict location context for a user of a mobile device, or both, that scales well to many users, such as incrementally determining location context.

According to one embodiment, a method comprises receiving signal data that indicates a set of one or more distinct signal sources from which signals are received at a mobile device for each of a plurality of different times. The method further comprises determining whether the mobile device is moving outside a specified area at a current time of the plurality of different times based on the signal data. The method further comprises incrementing a count for a stationary state associated with the set of one or more distinct signal sources at the current time, if the mobile device is determined to be not moving outside the specified area. The method also comprises delivering a service to the mobile device based on the stationary state.

According to another embodiment, a computer-readable storage medium carrying one or more sequences of one or more instructions which, when executed by one or more processors, cause an apparatus to receive signal data that indicates a set of one or more distinct signal sources from which signals are received at a mobile device for each of a plurality of different times. The apparatus is also caused to determine whether the mobile device is moving outside a specified area at a current time of the plurality of different times based on the signal data. The apparatus is further caused to increment a count for a stationary state associated with the set of one or more distinct signal sources at the current time, if the mobile device is determined to be not moving outside the specified area. The apparatus is also caused to delivering a service to the mobile device based on the stationary state.

According to another embodiment, an apparatus comprises means for receiving signal data that indicates a set of one or more distinct signal sources from which signals are received at a mobile device for each of a plurality of different times. The apparatus further comprises means for determining whether the mobile device is moving outside a specified area at a current time of the plurality of different times based on the signal data. The apparatus further comprises means for incrementing a count for a stationary state associated with the set of one or more distinct signal sources at the current time, if the mobile device is determined to be not moving outside the specified area. The apparatus further comprises means for delivering a service to the mobile device based on the stationary state.

According to another embodiment, an apparatus comprising at least one processor, and at least one memory including computer program code, the at least one memory and the computer program code configured to, with the at least one processor, cause the apparatus to receive signal data that indicates a set of one or more distinct signal sources from which signals are received at a mobile device for each of a plurality of different times. The apparatus is also caused to determine whether the mobile device is moving outside a specified area at a current time of the plurality of different times based on the signal data. The apparatus is also caused to increment a counter for a stationary state associated with the set of one or more distinct signal sources at the current time, if the mobile device is determined to be not moving outside the specified area. The apparatus is also caused to initiate delivery of a service to the mobile device based on the stationary state.

According to another embodiment, a method comprises facilitating access to, including granting access rights for, a user interface configured to receive signal data that indicates a set of one or more distinct signal sources from which signals are received at a mobile device for each of a plurality of different times. The method further comprises facilitating access to, including granting access rights for, a user interface that delivers a service to the mobile device based on a stationary state associated with a set of one or more distinct signal sources at a time when the mobile device is determined to be not moving outside a specified area based on the signal data.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2A is a diagram of a signal data stream, according to one embodiment;

FIG. 2B is a diagram of the components of a location context service module, according to one embodiment;

FIG. 3 is a flowchart of a process for incrementally determining location context, according to one embodiment;

FIG. 4 is a flowchart of a process to detect movement for the process of FIG. 3, according to one embodiment;

FIG. 5 is a flowchart of a process to incrementally update a stationary state for the process of FIG. 3, according to one embodiment;

FIG. 6A is a flowchart of a process to incrementally update a transition state for the process of FIG. 3, according to one embodiment;

FIG. 7A is a flowchart of a process to predict the next transition state for the process of FIG. 3, according to one embodiment;

FIG. 8A is a diagram of location context data at a client process, according to one embodiment;

FIG. 8B is a diagram of location context interface at a server process, according to one embodiment;

DESCRIPTION OF SOME EMBODIMENTS

A method and apparatus for incrementally determining location context are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
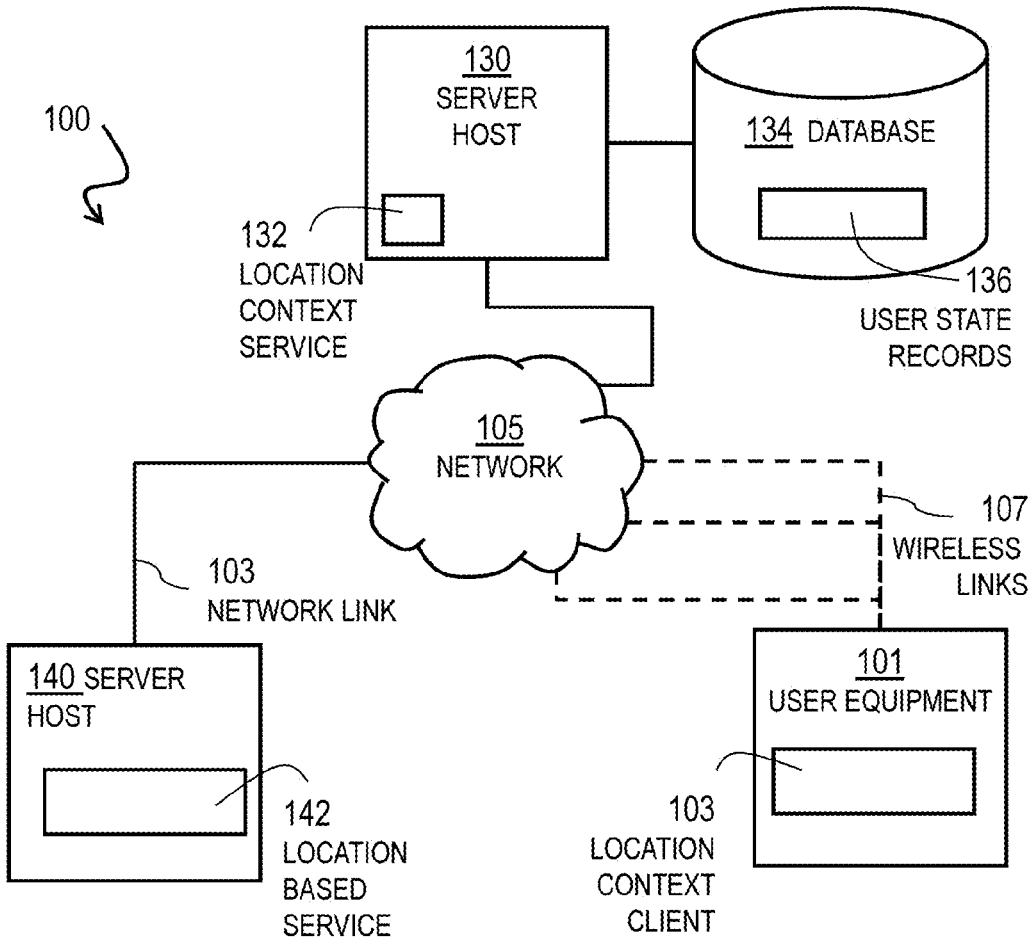
FIG. 1A is a diagram of a system capable of incrementally determining location context, according to one embodiment.

FIG. 1A is a diagram of a system 100 capable of incrementally determining location context, according to one embodiment. This embodiment does not require the excessive power consumption, storage, computational resources or user involvement of prior art approaches.

To address this problem, instead of predicting the exact geo-coordinates where a user is about to go, system 100 of FIG. 1A introduces the capability to predict the location state that the user is probably transiting to or from. As used herein, each location state for a user refers to a set of one or more anchoring points/regions in space, and the context is gleaned from those anchoring points or user comments or communications when associated with those anchoring points. The prediction task results in a sequence of predicted location states for a given time window after a query is made. By solving this problem accurately and efficiently, a set of new location based services (LBS) are enabled, which can smartly recommend information to a user based on his/her current and future location states.

In certain embodiments, an Incremental Location-State Acquisition and Prediction (iLoc) framework is provided to address the prediction problem by utilizing the sensor information on a user's mobile device. ILoc incrementally learns the location states by constantly monitoring the signal environment of the mobile device. Learning and prediction modules are tightly integrated into one single framework. As a result, iLoc is capable of updating location-states continuously, and simultaneously predicting future location states.

As shown in FIG. 1A, the system 100 comprises mobile user equipment (UE) 101 having connectivity to server host 130 and server host 140 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal or portable terminal including a mobile handset, station, unit, device, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.). The UE 101 communicates with the network 105 using one or more wireless links 107. An example mobile terminal is described in more detail below with reference to FIG. 18. The server host 130 or server host 140 is any mobile or fixed terminal; and each communicates with the network 105 through a network link 103 that may be wired or wireless.

The mobile UE 101 includes a location context client process 103 and the server host 130 includes a location context service process 132 to determine the location context of the UE 101. This location context is then provided to other network applications, such as location based service process 142 on server host 140. The location context service 132 employs a database 134 with one or more user state records 136, described in more detail below.

By way of example, the UE 101 and host 130 or host 140 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. Often the data in the payload for the particular protocol includes a header and payload for a different protocol that is said to be encapsulated in the lower layer protocol.

Processes executing on various devices, such UE 101 and server host 130 or server host 140, often communicate using the client-server model of network communications. The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host on which the process operates. Similarly, the term "client" is conventionally used to refer to the process that makes the request, or the host on which the process operates. As used herein, the terms "client" and "server" refer to the processes, rather than the hosts, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web (WWW) servers that provide web pages.

According to the illustrated embodiment, location context for the UE 101 is derived, at least in part, from signals received from distinct signal sources, such as signals that form wireless links 107. As used herein, the term stationary wireless transmitter refers to any wireless transmitter used for wireless communications, which persists in one location for an extended period of time that is long compared to the time for determining the location context of a mobile terminal, e.g., persists in one location for more than about a week. Although various embodiments are described with respect to wireless fidelity (WiFi) access points and global system for mobile communications (GSM) base stations, it is contemplated that the approach described herein may be used with other wireless communication transmitters, such as any of the transmitters used for network communications described with reference to communications network 105.

Figure 1B:
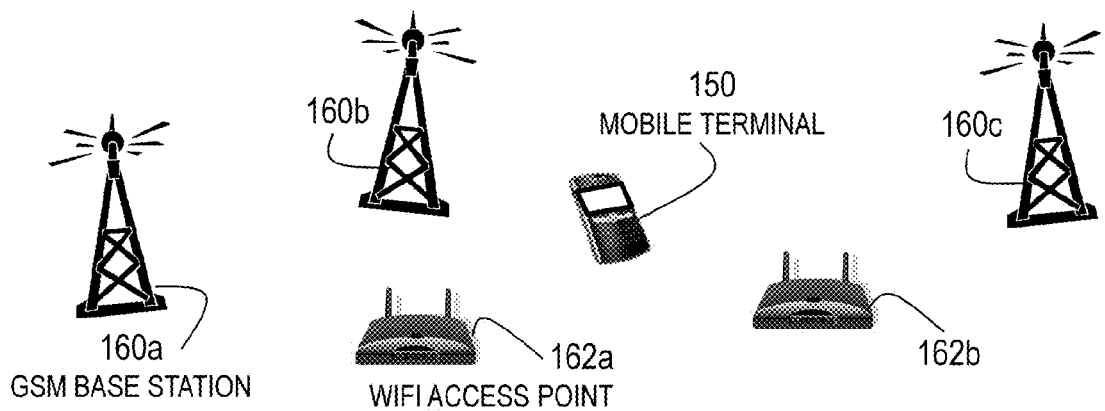
FIG. 1B is a diagram of distinct signal sources from which signals are received at a mobile terminal, according to one embodiment.

FIG. 1B is a diagram of stationary wireless transmitters from which signals are received simultaneously at a mobile terminal, according to one embodiment. The mobile terminal 150 is an example of mobile UE 101. It is assumed for purposes of illustration that the mobile terminal 150 is a cellular telephone that communicates with GSM base stations, and includes a WiFi network card that communicates with any WiFi access points within range. As depicted in FIG. 1B, the mobile terminal is within range of, and therefore exchanges data packets with, three GSM base stations 160a, 160b, 160c (collectively referenced hereinafter as GSM base stations 160) of a cellular telephone network. The mobile terminal is also within range of, and therefore may exchange data packets with, two WiFi access points 162a, 162b (collectively referenced hereinafter as WiFi access points 162) connected to the Internet.

According to an illustrated embodiment, the location context client 103 continuously samples the signal fingerprints from a user's mobile terminal 101. At each fixed sampling time interval (e.g., 30 seconds), it samples the signals received from all wireless transmitters in range and sends data indicating the transmitters of those signals to the location context service 132. For example, two signal fingerprints/vectors are sampled: the GSM cell identifiers; and the WiFi access point identifiers, (e.g., a service set identifier (SSID) which is the name of a wireless local area network (WLAN)). The signal fingerprints are sent to the location context service 132 in a signal data stream of one or more data packets.

FIG. 2A is a diagram of a signal data stream 200, according to one embodiment. The signal data stream 200 includes a first time field 201a, and a first signal data field 203a, followed by a second time field 201b and a second signal data field 203, followed by subsequent fields indicated by ellipsis 209. In some embodiments, the information in the time field 201a, 201b and others indicated by ellipsis 209 (collectively referenced hereinafter as time field 201) is inferred from the time that the data is received; and the time field 201 is omitted from the signal data stream 200. Each signal data field 203a, 203b and others indicated by ellipsis 209 (collectively referenced hereinafter as signal data field 203) holds data that indicates identifiers for one or more distinct signal sources within range for one or more types (e.g., WiFi or GSM) of wireless communications. For example, the signal data field 203 holds data for GSM base stations 160 and WiFi access points from which signals are received simultaneously at mobile terminal 150.

Any method may be used to indicate the wireless transmitter identifiers (IDs) in the signal data field 203. For example, in some embodiments, the code for the letters and numerals of each ID are explicitly included. In some embodiments the identifiers are of variable length are hashed to a fixed length number of bits. In some embodiments, a binary vector is defined with a vector position for each wireless transmitter encountered, with vector size increasing over time. A zero in a vector position indicates the corresponding transmitter is not in range of the UE 101 at a particular time, while a one indicates it is in range. In some embodiments the vector is included in the signal data field 203. In some embodiments, a list of the non-zero positions of the vector is indicted in the signal data field 203. The vector may be formed at the location context client 103 before transmission or by the location context service 132 upon receipt. In general, the contents of a single signal data field at time interval i, is a set represented by vector vi of one or more wireless transmitter identifiers α, e.g., $$vi = \alpha ik \text{ for } k=1, Ki,$$

where Ki is the number of wireless transmitter IDs received at the mobile terminal at time interval i.

While mobile terminal 150 is not moving substantively, e.g., not moving outside a limited or otherwise specified area, the identifiers indicated by successive signal data fields 203 are similar (changing slightly, for example, if one or more WiFi access points powers up or powers down or the user moves to different locations within an apartment). When mobile terminal 150 is moving substantively, however, the identifiers indicated by successive signal data fields 203 change more dramatically and are therefore less similar. When a mobile terminal is frequently not moving with similar sets of transmitter IDs, those similar sets define a stationary state, e.g., a limited area where the user of the mobile terminal has a tendency to stay. Transition states are defined by a fixed transition time interval (tick), an initial stationary state (From State) and a final stationary state (To State); and include states in which the initial and final states are the same stationary state. Thus a stationary state that persists for the tick, which most stationary states do, is a member of the set of all possible transition states. In some embodiments, the transition time interval (tick) is the same as the sampling time interval for determining whether a mobile terminal is moving. In general, however, the tick (e.g., about 10 minutes) is longer than the sampling time interval (e.g., 30 seconds to 2 minutes).

FIG. 2B is a diagram of the components of a location context service module 220, according to one embodiment. Module 220 is one embodiment of location context service process 132. It is contemplated that the functions of these components may be combined in one or more components or performed by other components of equivalent functionality on the same or different devices, computers or chipsets, including on host 130, host 140 or UE 101. In this embodiment, the location context service module 220 includes an annotation module 221, a learning module 222 and a prediction module 228, as well as an application programming interface API 240 for other applications to request and receive the current and predicted location states of a mobile device. The output from the learning module 222 is a signal data stream with movement classification 225 and a database 230 of stationary and transition states. The output from the learning module 222 is used by the state prediction module 228 to provide the current or predicted states, or both, 229 to the external application API 240. Thus the location context service module 220 accepts user input 210 and the signal data stream 200, and provides current and future location states 229 to one or more external applications 242. For example, the location context service module 220 determines that the user is currently at work but is about to leave for lunch; and passes this information to an external application 242, like location based service 142, such as a marketing service that provides restaurant coupons to a user going to lunch in the vicinity of a subscribing restaurant.

The user input is anything input by the user that is passed to the location context server, including any response to prompts for identifying the user's current location, to anything the user does or says at the mobile device, including applications opened and closed. For example, in some embodiments, when a primary stationary state is identified, as described in more detail below, the user is prompted to label the user's current location with a word or phrase that can be used to tag the associated stationary state. In some embodiments, the user's messages or voice calls are monitored while the user is in one of the primary stationary states, and the words are mined to derive a context for the stationary state. For example if the user repeatedly says or writes text indicating "working out," "aerobics," "exercise," etc. then it is deduced that the stationary state is associated with a gym.

The annotation module 221 takes the user input data 210 forwarded by the location context client 103 and determines a notation, label or tag, or some combination, to attach to a stationary or transition state determined by the learning module 222. The annotation component is responsible for connecting the user tagged states to the learned states. Thus, the output states information can have more semantic information attached (e.g., "at home" or "at work"). In embodiments using a passive mode, a server can listen to the content pushed out from a mobile device (e.g., micro-blogging). Based on the content, the location tagging information can be derived. In embodiments using an active mode, the user is prompted or polled for information. For example, these embodiments prompt the user to confirm different location tags when the system believes the user is in a stationary state of some importance. The system only needs to ask very few questions to the user, which makes the polling approach very feasible and less annoying to the user. In some embodiments, the annotation module 221 is omitted.

In some embodiments, the signal data stream 200 includes an occasional GPS geo-location that can be used to determine which particular location is associated with the stationary state and further provide context. For example, a street address can be determined for the gym at or near the GPS location associated with the stationary state tagged with the gym label. In some embodiments, the location context service module sends a request to the location context client 103 to capture a GPS position and include it in the signal data stream, for example while the mobile terminal is determined to be in a stationary state. By using only occasional GPS geo-locations, the power, memory and computational resources of the mobile terminal are not as heavily burdened as prior approaches that depend on GPS for predicting future user locations.

The learning module 222 includes a movement detection module 224, an incremental state learning module 226 and a database 230 with stationary states data structure 232 for each user and transition states data structure 234 for each user. Thus database 230 is an embodiment of database 134, while user state records 136 are implemented as stationary states data structure 232 and transition states data structure 234. The functions provided by each of these modules and data structures are described in more detail in the following diagrams and flowcharts.

Figure 2C:
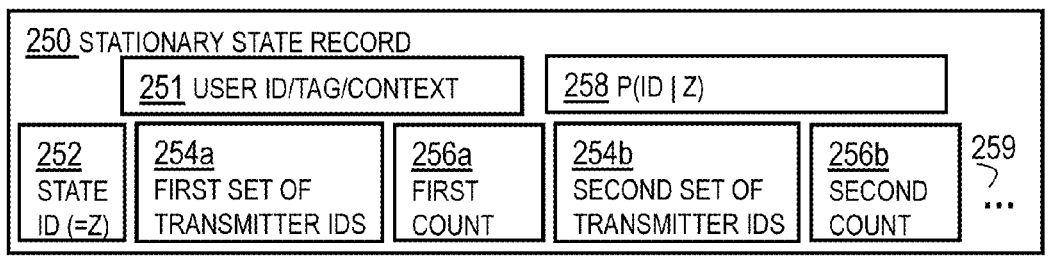
FIG. 2C is a diagram of a stationary state record, according to one embodiment.

FIG. 2C is a diagram of a stationary state record 250, according to one embodiment. The stationary state record 250 is one record in the stationary states data structure 232. The stationary state record 220 includes user ID/TAG/Context field 251, a state ID field 252, a probability field 258, and one or more fields holding sets of transmitter IDs, e.g., first set of transmitter IDs field 254a, second set of transmitter IDs field 254b and others indicated by ellipsis 259 (collectively referenced hereinafter as transmitter set fields 254), and one or more count fields, e.g., first count field 256a, second count field 256b and others indicated by ellipsis 259 (collectively referenced hereinafter as count fields 256).

The user ID/tag/context field 251 holds data that indicates the user (each user is expected to have different stationary and transition states and patterns of change). In some embodiments, the user ID/tag/text field 251 includes data that indicates a tag provided by the user, e.g. "work", or context determined by other means, e.g., from analysis of messages or GPS geo-location.

The state ID field 252 holds data that provides a unique identifier z for the stationary state, e.g. an index into the stationary states data structure or a sequence number that restarts for each user or mobile device.

Each transmitter set field 254, e.g., transmitter set field 254a, holds data that indicates one or more distinct signal sources, such as wireless transmitter IDs received simultaneously at the user's mobile terminal, e.g., the value of one vector vi received when the service determines that the mobile terminal is not. Each count field 256, e.g., count field 256a, holds data that indicates the number of sample intervals for which that particular set of transmitter IDs was received simultaneously. A different but similar set of transmitter IDs determined to correspond to the same stationary state is included in a different transmitter set field 254, e.g., transmitter set field 254b, with its corresponding count field, e.g., 256b.

The wireless transmitters indicated may be stationary or non-stationary transmitters. Using non-stationary transmitter (e.g., Bluetooth) involves a step to localize these transmitters. In some embodiments, mined stationary states from stationary transmitters (e.g., GSM, WiFi) are used to partition the non-stationary transmitters (e.g., Bluetooth or other ad-hoc networks). From these partitions, non-stationary transmitters can be identified which have good location sense (e.g., always appears when a user is in the office state) or context (e.g., in a particular automobile). After this step, the localized non-stationary transmitters are used in some embodiments for the purpose of determining stationary states or transition states or associated contexts or some combination.

As described in more detail below, a determination is made whether two different sets of distinct signal sources (e.g., transmitter IDs) are similar; and, in some embodiments, this determination is made based on the posterior probability (probability based on past history) of finding a particular transmitter ID given a particular stationary state. This probability is represented by the symbols P(ID/z). This value can be determined by sorting the transmitter IDs in the fields 254 and adding the counts for each set in which the ID appears and dividing by the sum of the counts in the count fields 256. Thus an ID that appears in every set will have a probability of 100%, while an ID that appears in a few sets will have a smaller probability. In embodiments, the probability for each transmitter ID in the stationary state is updated when the stationary state record 250 is updated, and the updated value is stored in the probability field 258.

Figure 2D:
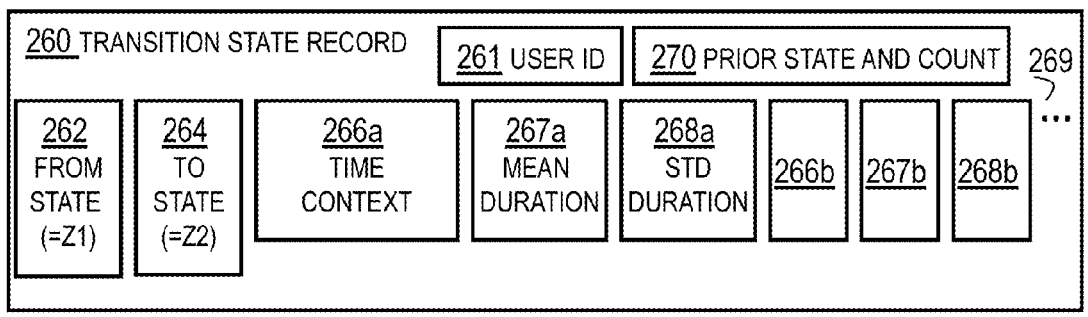
FIG. 2D is a diagram of a transition state record, according to one embodiment.

FIG. 2D is a diagram of a transition state record 260, according to one embodiment. The transition state record 260 is one record in the transition states data structure 234. The transition state record 260 includes user ID field 261, a From State ID field 262, a To State ID field 264, and a prior state and count field 270. The record 260 also includes one or more time context fields, e.g., time context field 266a, field 266b and others indicated by ellipsis 269 (collectively referenced hereinafter as time context fields 266). The record 260 also includes one or more mean duration fields, e.g., mean duration field 267a, field 266b and others indicated by ellipsis 269 (collectively referenced hereinafter as mean duration fields 267), and one or more duration standard deviation (STD) fields, e.g., STD duration field 268a, field 268b and others indicated by ellipsis 269 (collectively referenced hereinafter as STD duration fields 268).

The user ID field 261 holds data that indicates the user (each user is expected to have different stationary and transition states and patterns of change). The From State ID field 262 holds data that indicates the unique identifier z1 for the stationary state at the beginning of the time tick. The To State ID field 264 holds data that indicates the unique identifier z2 for the stationary state at the end of the time tick.

Each time context field 266, e.g., time context field 266a, holds data that indicates a temporal feature, such as weekend or workday, morning or afternoon or night, associated with the beginning of the time tick. Several temporal features can be defined. A temporal feature has a fixed number of domain values, which represent some semantic concepts of time. For example, a feature can have {morning, afternoon, evening} as its domain values. In Table 1, a set of example temporal features are listed which are used in an example embodiment. Each temporal feature has a unique ID; each value of a feature also has a unique ID that serves as a bin into which data is accumulated. In the illustrated embodiment, for purposes of illustration, very general features are defined. It is anticipated that more domain specific features can be easily added in other embodiments.

TABLE 1

Example Temporal Features

| Temporal Feature ID | Bin Value ID | Temporal Value |
|---|---|---|
| TF1 | B1 | Morning |
|  | B2 | Afternoon |
|  | B3 | Night |
| TF2 | B4 | Weekend |
|  | B5 | Non-weekend |
| TF3 | B6 | Weekend Morning |
|  | B7 | Weekend Afternoon |
|  | B8 | Weekend Night |
| TF4 | B9 | Vacation |
|  | B10 | Non-vacation |

Each mean duration field 267, e.g., mean duration field 267a, holds data that indicates mean duration in a transition state. Any method may be used to indicate the mean duration. In some embodiments, the mean duration field includes a count of how many occurrences of the transition in the current time context are observed so that duration can be updated by discounting the latest observed transition duration by it relative contribution to the overall count. Each STD duration field 268, e.g., STD duration field 268a, holds data that indicates a standard deviation of durations to accomplish a transition state. Any method may be used to indicate the STD duration. In some embodiments keeping the number of duration observations in the mean duration field 267, the STD duration field 268 indicates a sum of durations squared, which can be updated with each new duration squared. The standard deviation can be computed from the sum of the durations squared along with the number of observations and mean value, the latter two indicated in the mean duration field 267.

A particular transition state can be observed at different times and thus can be associated with more than one time context. Thus, in some embodiments a different temporal feature value is included in a different time context field, e.g., field 266b, with its corresponding mean duration field, e.g., 267b, and STD duration field 268b.

As described in more detail below, a determination is made of the probability of a different transition state given a current transition state and previous distributions of changes among transition states. Thus, in some embodiments, the transition state record 260 includes the prior state and count field 270. The prior state and count field 270 holds data that indicates the transition state (e.g., za to zb) observed just before the transition state (z1 to z2) indicated by fields 262 and 264. The prior state and count field 270 also includes data that indicates how many times that previous state (e.g., za to zb) was observed just prior to the current transition state. This data from every transition state record can be used to determine the posterior probability of distributions among different transition states. That data can be fit with a mathematical model in some embodiments, such as a multinomial fit, well known in the art.

Although records are shown above as contiguous blocks of data with particular fields in a particular order for purposes of illustration, in other embodiments one or more fields or records or portions thereof may be arranged in the same or different order on the same or different portions of a database on one or more network nodes.

FIG. 3 is a flowchart of a process for incrementally determining location context, according to one embodiment. In one embodiment, the location context service module 220 performs the process 300 and is implemented in, for instance, a chip set including a processor and a memory as shown FIG. 17, a mobile terminal shown in FIG. 18 or general purpose computer shown in FIG. 16. Although particular steps are shown in FIG. 3 and subsequent flowcharts (FIG. 4, FIG. 5, FIG. 6A and FIG. 7A) in a particular order for purposes of illustration, in other embodiments one or more steps are omitted or performed in a different order or overlapping in time, in series or in parallel, or additional steps are added, or the process is changed in some combination of ways.

In step 301, current data in the signal data stream is received. For example, signal data 203b in signal data stream 200 is received from mobile terminal 150 of a particular user. In step 303, the mobile terminal of the user is classified as moving or not moving at the current time. In an illustrated embodiment, step 303 is performed based on determining similarity of transmitter IDs at the current and a previous time, as described in more detail below with reference to FIG. 4. In some embodiments, steps 301 and 303 are performed by the movement detection module 224 of the learning module 222.

In step 305 it is determined, whether the mobile terminal is currently moving, based on the classification performed in step 303. If not, then in step 307, a stationary state record is updated. In an illustrated embodiment, step 307 is performed based on the posterior probability of finding the transmitter IDs in a particular state, as described in more detail below with reference to FIG. 5. After the stationary state is updated, or if it is determined in step 305 that the mobile terminal of the user is currently moving, then in step 309 data for a transition state of the user is updated. In an illustrated embodiment, step 309 is performed based on the posterior probability of a transition state duration for a given temporal feature, as described in more detail below with reference to FIG. 6A. In some embodiments, step 305 and step 307 and step 309 are performed by the incremental state learning module 226.

In step 311, it is determined whether there is sufficient historical data collected to make predictions of future transition states. For example, in some embodiments, different movements are expected on different days of the week, or at least between weekends and non-weekends, so that data over a significant portion of a week, such as about three days to about five days, are deemed sufficient to make predictions. In other embodiments, other durations are sufficient. For example, for emergency or military workers one day may be considered sufficient to make predictions. Step 311 includes determining whether there is any desire for predicting future states, e.g., because an external application 242 has requested a prediction out to a certain query time. If there is no request from any external application for prediction of a future state, then, in some embodiments, step 311 determines that there is not sufficient data for a prediction.

If data is not sufficient to make predictions, then in step 313 a service is delivered to a user based on the current or most recent transition state or stationary state. For example, an external application 242 queries the location context service 220 through application API 240 for the most recent stationary state, or the transition state that is based on the most recent stationary state, and delivers a coupon to the user's mobile terminal based on that state.

If there is sufficient data to make predictions, then in step 315 zero or more predictions of future transition states are made, including any transition states that maintain the same stationary state. In an illustrated embodiment, step 315 is performed by determining the most probable transition state at a future time based on the posterior probability of one or more transition states changing to a different transition state during a tick, as described in more detail below with reference to FIG. 7A. In some embodiments, step 311 and step 315 are performed by the state prediction module 228.

If it is determined in step 317 that conditions are satisfied for ending the determination of current and future states, the process 300 ends. Otherwise the process continues at step 301.

FIG. 4 is a flowchart of a process to detect movement for step 303 of the process 300 of FIG. 3, according to one embodiment. The process 400 is directed to detecting whether the mobile terminal appears to be moving, while accounting for the possibility that the population of transmitters may change somewhat even when a mobile terminal is stationary. The basic idea is that if terminal is not moving much, the corresponding signal fingerprints should remain relatively similar to each other. The signal data stream is partitioned into a sliding set of fixed length time windows (e.g., 10 minutes) ending at the current time. The two most recent time windows for an input signal data stream are determined. A similarity function M defined over the interval [0 to 1] is evaluated on these two windows. A classifier is then built by imposing a movement threshold value $T_M$ on the outcome of the similarity function.

In step 401, a current window is defined of one or more contiguous signal data fields 203 from the signal data stream 200 ending at the current time. In step 403 a previous window is defined having the same number of contiguous signal data fields, but ending at a time earlier than the current time. Each window therefore has w signal data fields. In some embodiments, the two windows overlap and include some signal data fields in both windows. In an illustrated embodiment, the previous window defined in step 403 ends on the last signal data field before the first signal data field of the current window defined in step 401. In some embodiments, each window includes only one signal data field.

In step 405 a similarity measure is determined for the signal data fields 203 in the two windows. Any similarity measure may be used. In an illustrated embodiment using GSM and WiFi streams, the similarity function is defined using cosine similarity, commonly used by many information retrieval systems. For the two time windows, the observations are grouped into 2 vectors v1 and v2, respectively. Where i is an index for the current sample time, the current window signal v1=vi, vi-1, . . . , vi-w; and the previous window signal v2=vi-w-1, vi-w-2 . . . vi-2w. The cosine similarity can then be defined by Equation 1.

$$M = v1 \cdot v2 / (|v1| \times |v2|) \quad (1)$$

In step 407, the similarity of the two windows is compared to a movement threshold $\tau_M$. If the similarity is greater than the threshold, then in step 411 the classifier determines that the mobile terminal is not moving. Otherwise, in step 409 the classifier determines that the mobile terminal is moving. After classification, the process ends; and control passes to step 305 of process 300.

FIG. 5 is a flowchart of a process 500 to incrementally update a stationary state in step 307 for the process of FIG. 3, according to one embodiment. At the start of process 500 a current vector vi of wireless transmitter IDs is provided for updating a stationary state. When the first vector of wireless transmitter IDs is received, there are no stationary states; that is, the set Z of stationary states is empty. The set grows as stationary states are learned incrementally over time.

In step 501, it is determined whether there is another stationary state to compare to the current vector vi. If not, then in step 503, a new stationary state based on the vector vi is added to the stationary states data structure, e.g., as a new stationary state record 250. For example, the very first vector vi when the mobile terminal is not moving is added as the first filed in the first stationary state record 250. A stationary state ID z is formed and stored in field 252, the wireless transmitter IDs in vi are stored in field 254a, and a count of 1 is stored in field 256a. The probability field 258 is updated for a 100% probability of finding each transmitter ID in vi, given stationary state z. The update process is then complete; and control passes to step 309 in FIG. 3 to update a transition state.

If another stationary state exists, then in step 505 the stationary state record for that stationary state z is retrieved. In step 507 the probability P(z|vi) is determined that the next stationary state is the stationary state given the current vector vi of transmitter IDs.

In step 509, it is determined if that probability P(z|vi) is greater than a cluster threshold $\tau_C$. If so, then in step 511, the stationary state record is updated, i.e., the current vector is added to the cluster of transmitter ID sets associated with the stationary state. In an example embodiment, the cluster threshold is a 10% probability. Thus is this embodiment, a probability of the current state z given the current vector vi greater than 10% causes the current state to be updated to include the set of transmitter IDs in vector vi.

In step 511 the stationary state record is updated. For example, the vector vi is matched to one of the sets of transmitter IDs in transmitter set field 254. If an exact match is found, then the associated count is incremented. If not, then a new transmitter set field 254 is added to the record with the exact set of transmitter IDs in vector vi, and its associated count field is set to indicate 1. In some embodiments, probability field 258 is also updated to indicate the new values for P(ID|z). The update process then ends, and control passes to step 307.

If it is determined in step 509 that the probability P(z|vi) is not greater than the threshold $\tau_C$, then control passes back to step 501, described above, to determine if there is another stationary state record already in the database.

In an illustrated embodiment, in step 507, the probability P(z|vi) is estimated based on the individual probabilities of each transmitter ID of vi given the stationary state, as found in field 258 of the stationary state record. Essentially, in step 507 the incremental state learning module 226 computes the posterior distribution of P(z|vi). Each input can be decomposed into a set of feature-value pairs, also called attribute-value pairs. For example, a WiFi signal input at time ti can have a set of Ki WiFi IDs represented as IDk, k=1 to Ki and can be treated as a binary feature. The posterior distribution can be estimated as given by Equation 2.

$$P(z|vi) = P(z) \times \Pi_{k=1 \text{ to } Ki} P(IDk|z) / (\Sigma_{j=1 \text{ to } Z} P(zj) \times \Pi_{k=1 \text{ to } Ki} P(IDk|zj)) \quad (2)$$

where Z is the number of stationary states in the set Z. The conditional independent assumption that $P(vi|z) = \Pi_{k=1,Ki} P(IDk|z)$ is similar to the Naive Bayes (NB) condition. It is a reasonable assumption since sensor features (e.g., WiFi SSIDs), very often, are independently installed. This assumption works when each P(IDk|z) is not equal to zero; otherwise the likelihood probability for the input vector Pr(vi|z) becomes 0. This is handled using two different considerations. In a first scenario, if a large portion (e.g., 70%) of the transmitter IDs in a input vector vi are missing from a cluster z, then the likelihood probability for that cluster P(z|vi) becomes 0. In the second scenario, only a small portion of the terms in the input vector are missing, given a stationary state z. Each of the missing terms IDk is assigned with a small probability. This way, the overall likelihood will remain non-zero. In experiments, described in more detail below, each missing IDk is assigned a value equal to a reciprocal of the size of stream inputs observed so far.

Thus, in the illustrated embodiment, to evaluate Equation 2, in step 521, the next IDk in vi is obtained. In step 523, it is determined whether the P(IDk|z)=0, e.g., because that particular wireless transmitter ID has not before been observed in the current state z. If so, then in step 525 a small non-zero value is assigned to the P(IDk|z), e.g., the reciprocal of the size of the signal data stream up to the current time. In step 527, it is determined if vi includes less that 70% of the transmitter IDs already detected in stationary state z. If so, then control passes to step 531 to set the value of P(z|vi)=0, to ensure that the record for the current stationary state z is not updated.

If it is determined that P(IDk|z) is not equal to zero in step 523, or that vi includes 70% or more of the transmitter IDs in z, then control passes to step 529 to determine if there is another IDk in vi. If so, control passes back to step 521 to get the next IDk in vi. Otherwise P(IDk|z) is non-zero for all k=1 to Ki, and Equation 2 can be evaluated. In step 533 P(z|vi) is determined using Equation 2, which is a function of the P(IDk|z) for k=1 to Ki.

FIG. 6A is a flowchart of a process 600 to incrementally update a transition state for step 309 of the process of FIG. 3, according to one embodiment. The transition states provide the capabilities for performing temporal prediction, such that given the past observations of transition states, the future transition states can be predicted. There are two types of transitions: self-transition; and transition from two different stationary states. In a transitional model, the transition state space S includes all the possible pair of stationary states (i.e., S={(za–zb) for a, b=1, Z}). The process starts by evaluating the significance of the last known stationary state z. The probability P(z) is also known as support for the stationary state. If the support of the stationary state is bigger than a predefined minimum support, it is regarded as significant. Different minimum support settings are evaluated in the described embodiments. It is assumed for purpose of illustration that the minimum support is 1%. If the stationary state is significant (e.g., has a probability greater than the minimum support), and if the subject is on the move, at the point of recording the destination is not known yet. The information of the From State and time context information is cached. Once the subject reaches a stationary state, if the cached From State is not empty, a transition involving different stationary states is updated. Otherwise, a self-transition is updated.

Given the time and transitional information, the probabilities of the next transition state given the previous transition state, P(si+1|si), are updated using the temporal features and past observations according to Equation 3.

$$P(si+1|si)=P(si+1|si,\gamma,\beta 1 \ldots \beta B) \qquad (3)$$

where $\gamma$ represents the time duration for staying in si. A set of B temporal features is obtained ($\beta 1 \ldots \beta B$). The temporal feature-value pairs are not allowed to include each other, as described in more detail below with reference to a precedence graph; and thus, they can be assumed to be conditionally independent.

Figure 6B:
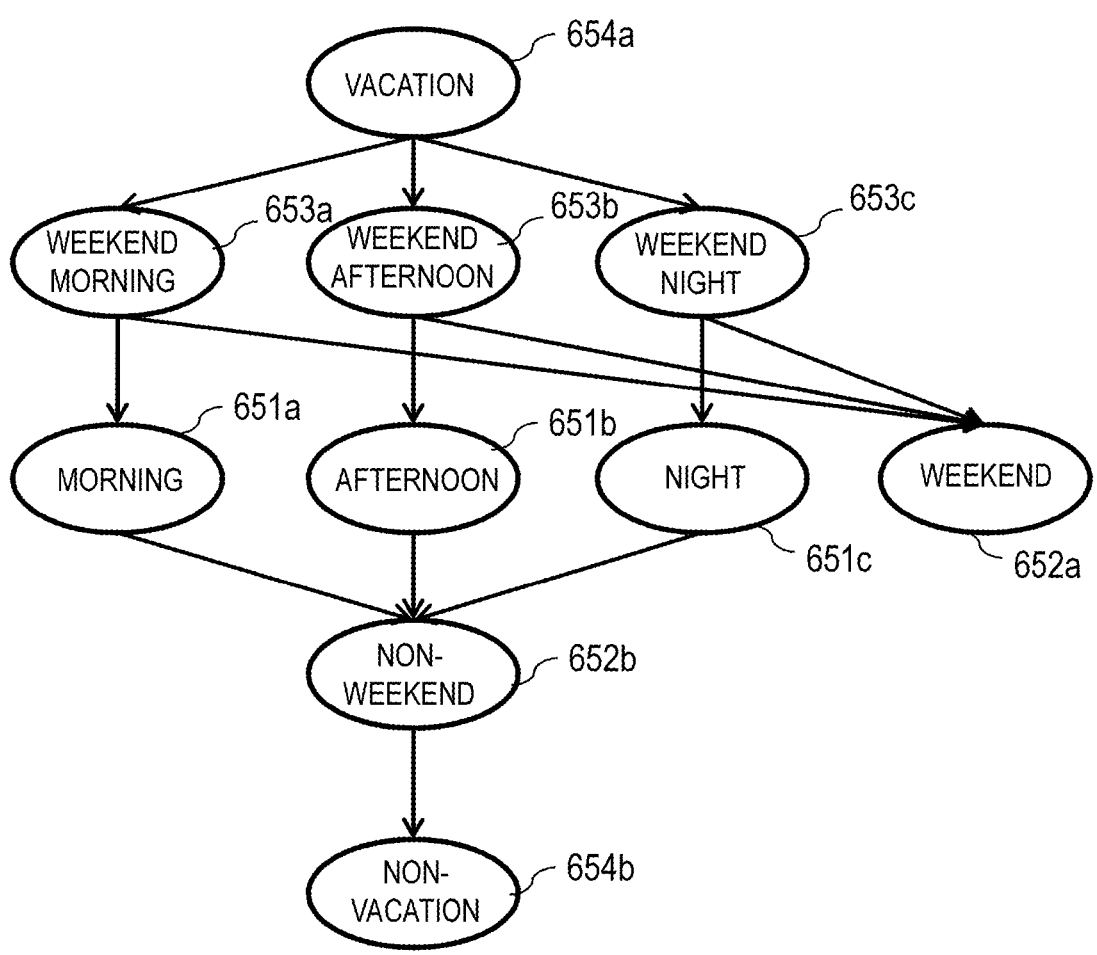
FIG. 6B is a diagram of precedence for multiple temporal features, according to one embodiment.

To allow the assumption of conditional independence, the dependencies are removed using a precedence graph. Given a time instance ti, it is possible to have multiple matching temporal feature-value pairs. It is desirable to select only those that are discriminative or important. The precedence graph encodes the importance relationships. The graph defines a partial-order for all the temporal feature-value pairs. FIG. 6B is a diagram of precedence for multiple temporal features, according to one embodiment. The precedence graph 600 has a node for each value of each feature. The nodes for the values for the first feature are morning node 651a representing B1 from Table 1, afternoon node 651b representing B2 and night node 651c representing B3. The nodes for the values for the second feature are weekend node 652a representing B4, and non-weekend node 652b representing B5. The nodes for the values for the third feature are weekend morning node 653a representing B6, weekend afternoon node 653b representing B7 and weekend night node 653c representing B8. The nodes for the values for the fourth feature are vacation node 654a representing B9, and non-vacation node 654b representing B10. The nodes above dominate connected nodes below, e.g., are more useful descriptions that include and replace the less useful description.

With the precedence graph, the time instance ti can be better characterized. Table 2 illustrates the process of extracting the time features.

TABLE 2

Temporal Feature extraction.

| Time | Matched Bin Value IDs | Extracted Bin Value |
|---|---|---|
| 8AM Jan. 9, 2009 | {Morning, Non-Vacation} | {Morning} |
| 8AM Jan. 10, 2009 | {Morning, Weekend Morning, Non-vacation} | {Weekend Morning} |
| 8AM Jan. 12, 2009 | {Morning, Vacation} | {Vacation} |

First the time instance is matched to all possible temporal feature-value pairs. The precedence graph is checked to eliminate those values that have been dominated. For example, 8 A.M. on the January 9th is a normal work day morning, it matches two feature-value pairs (TF1B1:Morning and TF4B10:Nonvacation). Since Morning is more discriminative than Non-vacation, Morning has higher precedence and is used as the final time feature bin value extracted. In the end of the extraction process, only a set of one or more important feature-value are left to represent the time interval from leaving stationary From State (z1) and arriving at stationary To State (z2).

With the assumption of time feature independence, Equation 2 can be expanded using Equation 3.

$$P(si+1|si,\gamma,\beta 1 \ldots \beta B) = \Pi_{b=1toB}P(s|si,\gamma,\beta b)/(\Sigma_{q=1toS}\Pi_{b=1toB}P(sq|si,\gamma,\beta b)) \qquad (3)$$

To estimate the values of P(s|si,γ,βb), first the probability P(si|si,γ,βb), also known as survival probability, is estimated. The survival probability means the probability that the subject stays in the same transitional state si at the next time tick. A normal distribution with mean µ and standard deviation σ is used to model a given observed distribution of duration values from γ, as given by Equation 4.

$$P(si|si,\gamma,\beta b)=1-\int_{-\infty to\gamma}N(\mu \cdot \sigma)dx \qquad (4)$$

An example illustrates the process. It is assumed for purposes of illustration that the subject is in a transition state s1 at time ti. From the past data, for a time feature value of βj (e.g., TF1B1:Morning), it is known that the subject transitions to another state s2, s3 etc. in 20 minutes on average (i.e., µ=20) with standard deviation of 5 minutes (i.e., σ=5). If the subject has already stayed in s1 for 25 minutes, the probability of remaining in s1 reduces to 16%, which also means that the probability of changing to another transition state is 84%. Knowing the survival probability, the total probability of going to other transitional states P(s≠si|si,γ,βb) is known as the remaining probability=1−survival probability. Depending on the meaning of si, probability of transiting to other transitional states is computed differently. In a first situation, si represents moving from one stationary state z1 to a different stationary state z2. Since the destination is specified, P(s≠si|si,γ,βb) represents the probability of reaching z2 (i.e., s=(z2–z2)). In a second situation, if si represents staying in a stationary state, then P(s≠si|si,γ,βb) represents the total probability of changing to other transitional states, given by Equation 5

$$P(s\neq si|si,\gamma,\beta b)=\Sigma_{q=1toS,\neq i}P(s=sq|si,\gamma,\beta b) \qquad (5)$$

If it is known that si is about to transit to sq, the duration of staying at si becomes irrelevant, and hence P(s=sq|si,γ,βb)) equals to P(s=sq|si,γ,βb), which can be modeled by a multinomial distribution fit to historical data. The parameters of the distribution can be maintained in the database 230, e.g., in one or more transition state records 260, when new observations arrive. Thus in process 600, depicted in FIG. 6A, the most recent stationary state z is determined in step 601. In step 603, it is determined if P(z) is greater than the minimum support (5-min). If not, a transitional state from this stationary state is not sufficiently important, and the process ends without updating a transitional state. Otherwise the duration γ is incremented by the tick time (e.g., 10 minutes). In step 607 it is determined whether the mobile terminal is moving based on the moving classification received from the movement detector. If so, then the From State (z1) is set equal to the last stationary state z. The precise transition state is unknown because the mobile terminal has not yet arrived at the To State, and the process ends.

If it is determined in step 607 that the mobile terminal is not moving, then in step 611, the To State (z2) is known as the current stationary state z and is set equal to that value. In step 613, it is determined whether the From State has been set. If not, z1 is null and control passes to step 615 to set the current transition state si to the self-transition with the From State the same as the To State z2, both equal to z. If the From State had been set, then z1 is not null and in step 617 the transition state si is set to the transition from state z1 to z2=z. The From State z1 is set to null. In either case, control passes to step 619 to update the transition state si with duration γ, current time feature β. In some embodiments the duration is restarted, e.g., set to zero; thus, a self transition will always have duration equal to the tick time. In some embodiments, the self transition duration is not reset to zero until the mobile terminal is classified as moving again.

In step 621 the probability of the next transition state given the current transition state P(s|si) is determined to support predictions. Then the process ends and control passes to step 311 of process 300 in FIG. 3.

In the illustrated embodiment, step 621 includes steps 623 to step 631. In step 623 the mean μ and standard deviation σ of duration in the transition state si for time feature β is determined, e.g., extracted from field 267 and field 268 in transition state record 260. In step 625 the survival probability P(si|si) is determined based on μ and σ, e.g. using Equation 4. In step 627 it is determined whether the current state si is a self-transition state in which z1=z2. If not, then in step 629 the probability of returning to the most recent stationary state (not transitioning) is determined as the remaining probability 1−P(si|si), and the process ends.

If it is determined in step 627 that the current state si is a self-transition state in which z1=z2, then duration does not matter and control passes to step 631 to determine the likely transitions to different stationary states based on historical distribution of transition state changes. For example a multinomial distribution is fit to the historical data based on the prior state and counts in field 270 in each transition state record 260. This distribution is used to apportion the remaining probability 1−P(si|si) among the other possible transition states sq, where q≠i, and the process ends.

FIG. 7A is a flowchart of a process 700 to predict the next transition state for step 315 of the process 300 of FIG. 3, according to one embodiment. Given a prediction time window that includes x number of time ticks after current tick ti, the prediction task can be formalized as P(si+1 ... si+x|s0 ... si), which represents the past transition state observations s0 ... si and future observations si+1 ... si+x. Directly estimating this probability distribution is not feasible since the space for storing the joint distribution is overly burdensome. In the illustrated embodiments, the first-order Markov chain assumption is made, such that the probability of observing transition state si+1 at time tick ti+1 is only conditionally dependent on the transition state si at ti. The prediction task can then be simplified and effectively performed as given by Equation 6.

$$P(si+1 \ldots si+x|s0 \ldots si) = \Pi j=i \text{ to } i+x P(sj+1|sj)$$

The first-order Markov assumption is reasonable since in the practical situations, the locations where the mobile terminal is about to go are highly associated with the current location, but less so for the previous locations. Since an efficient process for computing Pr(si+1|si) has been described above in step 621, the prediction task becomes feasible. The prediction task in process 700 is separated into two sub-tasks. The first task in step 701 is to predict the most probable transitional state si at current time ti. The second task in step 703 is to predict the most probable state sequence for the future time window x.

In step 701, there are two possible scenarios considered. In the first scenario, at the point of prediction ti, the movement detection module 224 does not detect any movements; and the incremental state learning module 226 indicates one of the stationary states zi. Therefore, the transitional state represents a self-transition si=(zi−zi). In the second scenario, the movement detection module 224 reports the mobile terminal is on the move, at the query time ti, and the final stationary To State z2 is unknown, so si is also unknown. The last self-transitional state is known at a previous time t0, and is represented as s0. In this case, the prediction starts from the last self-transitional state. The time interval from the last stationary state is made discrete into a set of time ticks (e.g., 10 minutes each). Based on the first-order Markov assumption, the most probable transition is assumed at each step, which is an implementation of the well-known Viterbi algorithm to compute the most probable transitional state at query time ti. The Viterbi algorithm is a dynamic programming algorithm for computing the Viterbi path, which corresponds to a sequence of transitional state sequence with maximum probability. At query time ti, there are m time ticks from last stationary state. The best transition state at time ti has a probability of: P=max(P(sm)). The states at each earlier time tick j can be defined as: P(sj)=max(P(sj|sj−1)). For the starting state s0, the following is set: P(s0=(z0−z0))=1 and P(s0≠(z0−z0))=0 since it starts from a self-transition in a known stationary state z0. In FIG. 7A, current time ti is simplified as current time t; and si is represented as St.

Thus in step 705, the most recent stationary state z0 and the associated time t0 are determined. In step 707 it is determined if the movement detector has classified the mobile terminal as moving. If not, then si=(z0-z0), and step 701 is complete.

If it is determined in step 707 that the movement detector has classified the mobile terminal as moving, then in step 711, the number of time ticks since the last stationary state is determined using Equation 7.

$$m = (ti - t0)/\text{tick} \quad (7)$$

In step 713 the most probable transition state is determined at each time tick, e.g., j=1 to m, according to Equation 8.

$$P(sj) = \max(P(sk|sj-1, \gamma, \beta)) \text{ for } k=1 \text{ to } S \quad (8)$$

Where max is an operator that returns the maximum value of a set of values indicated in the argument. For a given transition state sj−1 of duration γ and time feature β, there is a finite probability of remaining in the same transition state and a finite or zero probability of changing to each of one or more different transition states. These state are represented in Equation 8 as sk, k=1 to S (the total number of transition states). The max operator compares all these probabilities, many of which are zero, and selects the most probable one as sj. At the last time step, the most probable current transition state si=St is computed and step 701 is complete.

In step 703 the entire Viterbi path into the future is returned, not just the transition state at the end time tX. Given the query end time tX, the time is divided from the last known stationary state z0 (or the current transition state si) again into a discrete number (represented by the number X) of time ticks (e.g., 10 minutes), and output the transition state sequence with the maximum probability. Thus in step 721 the number X of ticks is determined using Equation 9.

$$X = (tX - t0)/\text{tick} \quad (9)$$

And in step 723, the most probable sequence of transition state is determined at each time tick, e.g., j=1 to X, according to Equation 8, above.

Figure 7B:
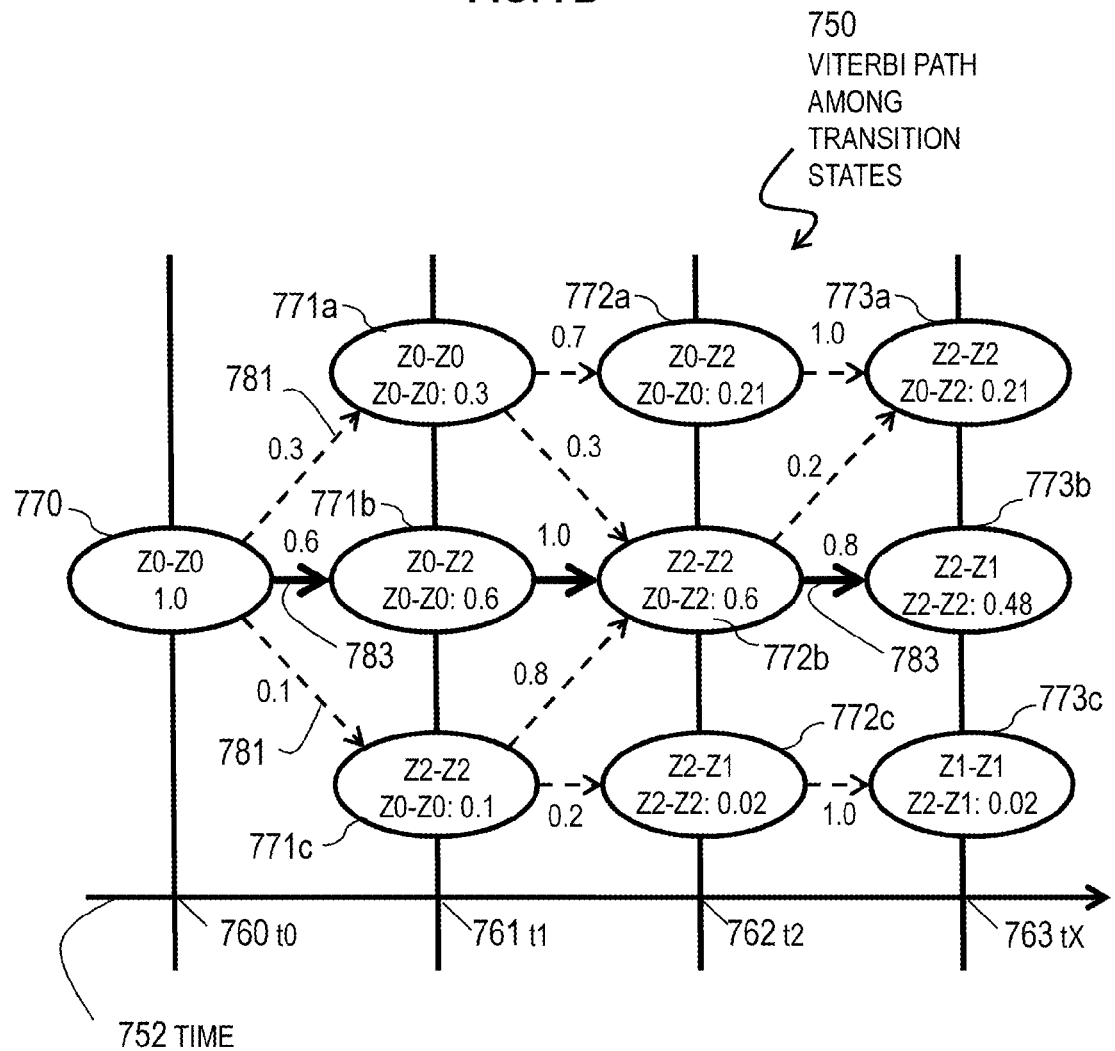
FIG. 7B is a diagram of a Viterbi path among most probable transition states, according to one embodiment.

FIG. 7B is a diagram 750 of a Viterbi path among most probable transition states, according to one embodiment. Time increases to the right as indicated by time axis 752. A particular time is represented by a vertical line segment at the discrete time t0 760, time t1 761, time t2 762 and time tX 763. The distribution of transition states at each time are represented by nodes, e.g. node 770 at time t0, nodes 771a, 771b, 771c at time t1, nodes 772a, 772b, 772c at time t2 and nodes 773a, 773b and 773c at time tX, collectively referenced hereinafter as transition state nodes 777. The probability of changing from one transition state to another is presented as a number next to a dashed arrow 781 or solid arrow 783 connecting the initial transition state to the next transition state. The most probable path at each time step is indicated by the solid arrow 783. Each transition state node 777 indicates a stationary From State and stationary To State in a top row. Each transition state node 777 also indicates a probability of being in that transition state and the previous transition state that is most likely to change to that node. The most likely previous transition state can be determined, for example, from the data in the prior state and count field 270 in the transition state record 260.

FIG. 7B illustrates a temporal range query. In this example, there are X=3 time ticks. Each node in this graph represents a transitional state sx indicated as a pair of stationary states. Therefore, at the end of the query time ticks, the most probable (48%) transitional state (z2–z1) results. If one backtracks using the previous best node, one obtains the best sequence from time t0 to time tX to be: {(z0), (z0–z2), (z2), (z2–z1)}, which means that the mobile terminal is predicted to transit to the stationary state z2, and then start transiting to the stationary state z1.

The complexity of the system represented by the processes depicted in FIG. 3 through FIG. 7A is estimated here. As determined in the experiments described in more detail below, the complexity is very manageable and scales well to a large number of users. Thus a reasonable number of servers and hosts can service a large number of location context users.

In terms of storage complexity, since the set of transitional states S consist of all possible pair of stationary states, space on the order of $|Z|^2$, indicated as $O(|Z|^2)$, is useful. To maintain the transitional states, up to all the pair-wise transitional behavior from all the transitional states $(P(sk|si,\gamma,\beta j))$ would be useful. That involves $O(|S|^2)$ space. If there are B temporal feature-value pairs, the overall storage requirement is bounded by $O(B \times |S|^2)$. For example, if 10 stationary states exist, there may be 100 possible transitional states and 10,000 possible pair-wise transitions. Fortunately, in practice, many of the transitional states are not possible (e.g., from 'work' directly to 'vacation hotel'), which drastically reduces the number of pair-wise transitions. Therefore, the models can be efficiently stored.

In terms of computational complexity, for every sensor input v that goes through the incremental state learner module 222, the movement detection module 224 uses ON) time for similarity computations. During the state mining process, a hash table is built on the transitional states S, and possible pair-wise changes among them. It takes $O(\log(B \times |S|^2))$ on average to update the models. Therefore, for each input, the cost is $O(|v|)+O(\log(B \times |S|^2))$. If the size of each input is small, the movement detection has approximately constant cost. Therefore, the cost of processing n stream inputs is $O(n \log(B \times |S|^2))$. For the large number of inputs and small number of transitional states, the overall complexity is almost linear with number of inputs.

The overall complexity of the prediction module depends on how many pair of the transition states are involved between two time ticks. In the worst case it can be up to $|S|2$. Hence the worst case complexity is $O(m|S|^2)$. In practice, not all the transition states between two time ticks are possible because of the time constraints, which is especially true when the number of time ticks X is small. Therefore, the prediction process is expected to be very efficient when the prediction time window is small (e.g., 1 hour), but less efficient when it is big (e.g., 1 day or 1 week).

Experiments

Extensive experiments with certain embodiments show that the quality of the location-states learned by iLoc is better than the quality of the other known approaches. It is also demonstrated that when learning processes of other approaches failed to produce reasonable predictions, iLoc still provides good forecasts. As for efficiency, iLoc passes the data only once, whereas learning processes of other approaches require multiple iterations. In fact, iLoc does not require caching any data records on the mobile device, which fits well with many data stream processing models.

In the experiment, certain embodiments were implemented using Python. The run time reported in these embodiments are measured from a P4-2 GigaHertz (GHz, 1 GHz=109 Hz, 1 Hz=1 cycle per second) PC with Linux operating system (OS). For comparisons, a Latent Dirichlet Allocation (LDA) model and a hidden Markov model (HMM) are also implemented. The LDA and HMM models are generated by utilizing various statistical tools from MATLAB™ of MATHWORKS™ of Natick, Mass.

Although LDA has shown very good performance in text mining domains, there are a few problems when applied to location context. The first problem is that LDA does not consider time dependencies. Each record/document is assumed to be independent or interchangeable. Hence, LDA cannot be directly used for predicting future location states. The second problem is that LDA does not have the semantic concept of stationary states, which represent the places that a user stays. In a LDA model, a WiFi source encountered while moving will appear in both the starting and final stationary states, which leads to poor clustering performance. Furthermore, it is difficult to incrementally update the LDA model, especially in deciding the number of clusters and estimating the parameters. Although other non-model based clustering algorithms like K-means or hierarchical agglomerative clustering (HAC) can also be applied, they have been shown less accurate than model-based methods; and, these non-model based methods also suffer from similar problems to those of LDA.

HMM is also a generative model, such that each observation is generated by a latent state variable. The latent state at a time point also depends on its previous latent state. The parameters in the HMM can be estimated by using Baum-Welch algorithm, which is a generalized expectation maximization (GEM) algorithm. Although modeling state transition is part of HMM, the states do not physically correspond to the location states. This leads to poor performance in predicting future movements. For HMM, the observation sequence is not available at the point of prediction. For example, only given the first 2 records, it is desirable to predict the transition between the two location states. Without providing future observations, HMM is very unlikely to predict the transition.

The experiments employ GSM and WiFi sensor data, because these two types of data have clear location sense, and are widely available. Experimental data was obtained by continuously monitoring 3 users for a period of 66 days.

A data collection client serving as location context client 103 is implemented using Python for S60, and runs on S60 series mobile phones from NOKIA of Espoo, Finland. The client periodically uploads the data to a server. The overall service is also known as NOKIA Simple Context service. FIG. 8A is a diagram of location context data 800 at a client process, according to one embodiment. In the illustrated embodiment, FIG. 8A shows a screen capture of the client running on a N95 mobile phone from NOKIA. The client is highly customizable, with the capabilities of monitoring multiple sensors (GSM, WiFi, GPS, Bluetooth, etc.) at the same time. One interesting feature of the client is an adaptive GPS, which uses the same movement detection module described above to control the GPS sensing. It can smartly turn on the GPS when the device is on the move, and switch it off otherwise. Although the GPS data is used to geo-tag the WiFi and GSM signal sources in the certain embodiments involved in the experiments, it is anticipated that other embodiments further utilize the GPS data in the incremental state learning module 226.

FIG. 8B is a diagram of location context interface 850 at a server process, according to one embodiment. The interface 850 displays the last few records of a user in panels 852, 854, 856 and 858. Panel 852 displays data that indicates the use identifier (ID) and other context information, such as applications running or messages sent. Panel 854 displays data that indicates a list of WiFi and GSM transmitter identifiers (IDs). Panel 856 displays a map of the user environs based on a last GPS position. Panel 858 displays data that indicates allocation of computer-readable storage on the mobile terminal.

Once the data sent from the client is stored on the server, various APIs (e.g., API 240) can be used to retrieve/download the data. Although the embodiments employed in the experiments are built on a PC, the code can also be directly run on the mobile client in a real-time mode. A standard PC is used to benchmark the performance against other alternative or prior art approaches like LDA and HMM.

Figure 9A:
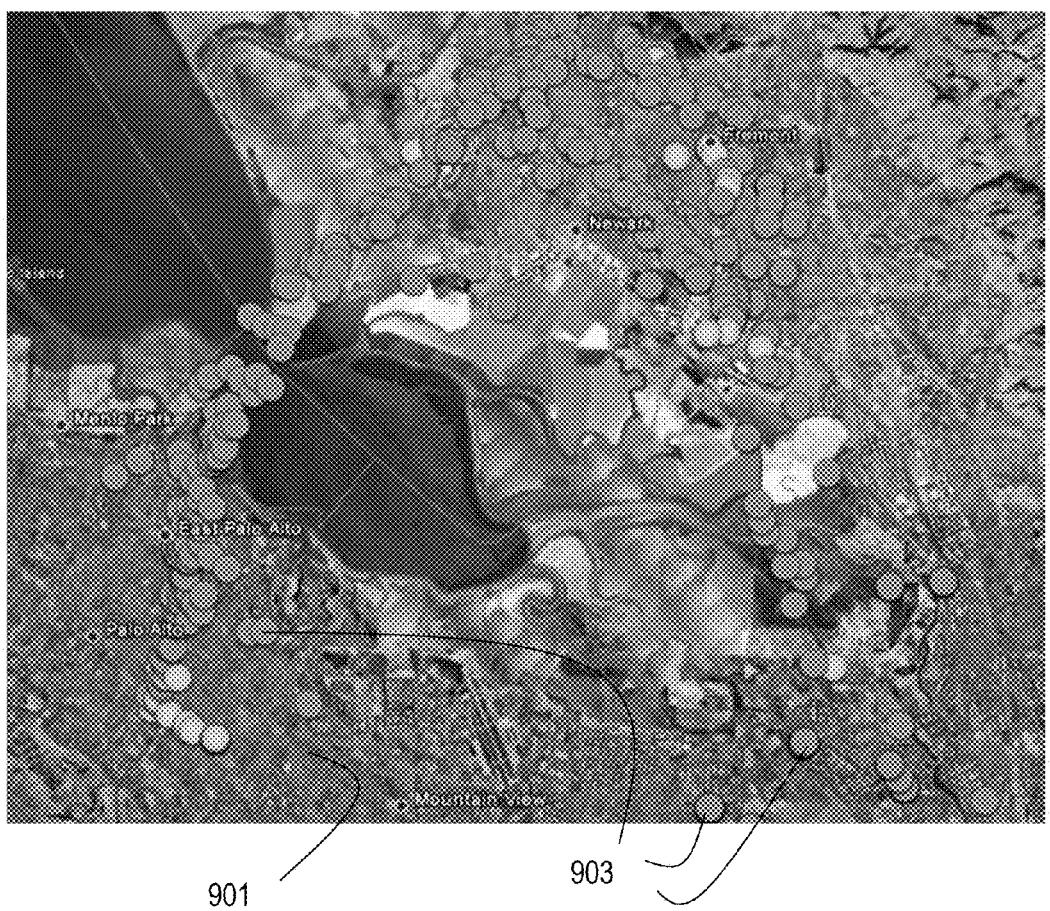
FIG. 9A and FIG. 9B are maps of transmitter coverage for GSM cells and WiFi access points, respectively, according to some embodiments.
Figure 9B:

During the experimental time period, thousands of distinct WiFi access points and GSM cell IDs have been observed. FIG. 9A and FIG. 9B are maps of transmitter coverage for GSM cells and WiFi access points, respectively, according to various embodiments. These cells are geo-tagged based on one user's data and plotted on a map image 901 of the experimental area. The GSM signal source locations 903 and WiFi signal source locations 905 cover a very large geographic region. It is noted that it is not sufficient to only use an individual signal sources (e.g., a single GSM cell ID) to represent a stationary state. Many of these signal sources do not correspond to a stationary state (e.g., they are discovered during commuting); and many of them represent the same stationary state (e.g., multiple WiFi access points in one scan).

In Table 3, data sets for the users during the period of 2 months are summarized. Table 3 shows the total number of records and the number of distinct signal sources (e.g., transmitter IDs) for each user. Notice that the number of records for WiFi is less than GSM. This is because a WiFi scan is more power consuming than a GSM scan, and hence WiFi scans are done at slower rate than GSM scans. For these users, WiFi scanning rate is set between 2 and 5 minutes, and the GSM scanning rate is set between 30 seconds and 2 minutes. In the reminder of this section, focus is on User 1's data to understand how well each component works. All users' data are included to summarize the overall performance.

TABLE 3

Experimental Data Seta

| | User 1 | | User 2 | | User 3 | |
|---|---|---|---|---|---|---|
| Type | # records | # transmitters | # records | # transmitters | # records | # transmitters |
| GSM | 88,204 | 643 | 50,995 | 1,137 | 67,777 | 625 |
| WiFi | 41,995 | 2,936 | 23,818 | 3,669 | 34,921 | 3,718 |

Table 4 shows the default parameter settings used by iLoc. For different components, the parameters have different sensitivity. For instance, the threshold settings in movement detection module and stationary state portion of the incremental state learning module 226 are less sensitive than the parameters used in the transitional state portion of the incremental state learning module 226. Therefore, in the later part in this section, the performance implications in changing the parameter values are evaluated.

TABLE 4

Default parameter settings

| Component | Parameter | Values |
|---|---|---|
| Movement detection module | movement threshold $\tau_M$ | 10% |
| Incremental State learning module (stationary state update) | cluster threshold $\tau_C$ | 10% |
| Incremental State learning module (transition state update) | Minimum Support Temporal Features | 1% Table 1. |
| State Prediction Module | Time tick | 10 minutes |

Figure 10A:
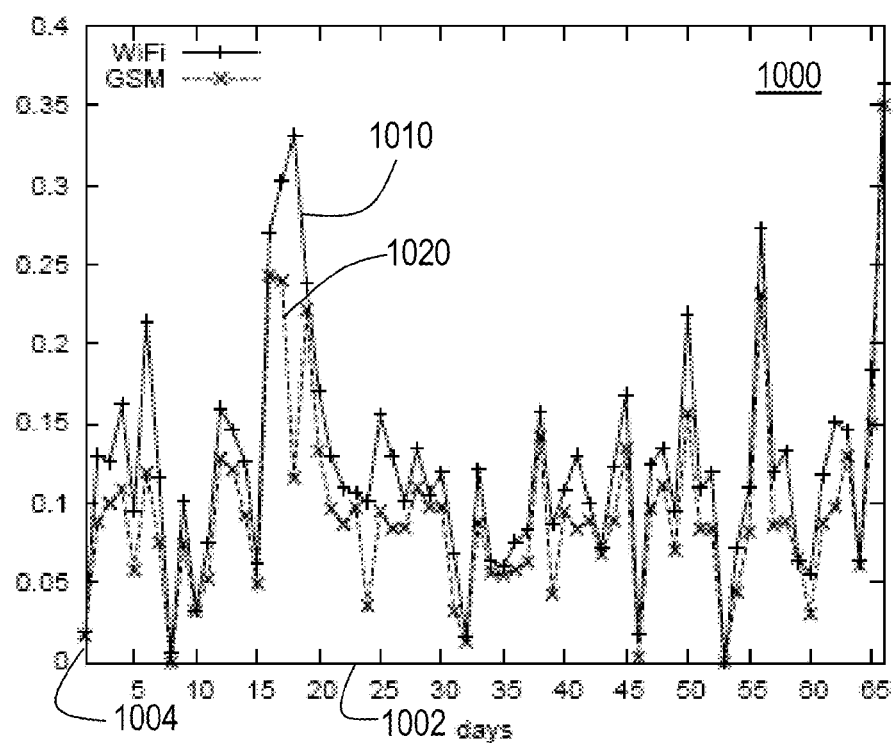
FIG. 10A is a graph of a ratio of moving periods to non-moving periods for a mobile terminal, according to one embodiment.

FIG. 10A is a graph 1000 of a ratio of moving periods to non-moving periods for a mobile terminal of User 1, according to one embodiment. The horizontal axis 1002 is time in days. The vertical axis 1004 is ratio of time that the mobile terminal is moving divided by the time that the mobile terminal is stationary on that day. Trace 1010 depicts the detection of movement based on the WiFi data stream; and trace 1020 depicts the detection of movement based on the GSM data stream. The daily movement ratio for User 1 shows the effectiveness of the movement detection module 224. It is seen that movements are not limited only to the weekends, but include the weekdays as well. User 1 confirmed that the movement detection module 224 can correctly capture large movements—especially for commuting to different locations. In Table 5, the average movement ratio per day is computed for all users. Note that the WiFi data stream can capture more movements than the GSM data stream. This is because a WiFi access point normally has smaller spatial coverage than a GSM cell, and hence this data is more sensitive to the movements. However, the difference is not very large, which indicates that GSM cells can also be used for movement detection.

TABLE 5

Movement ratio per day.

| Data Stream Type | User 1 | User 2 | User 3 |
|---|---|---|---|
| GSM | 9.2% | 16.2% | 10.1% |
| WiFi | 12.4% | 24.9% | 14.2% |

Figure 10B:
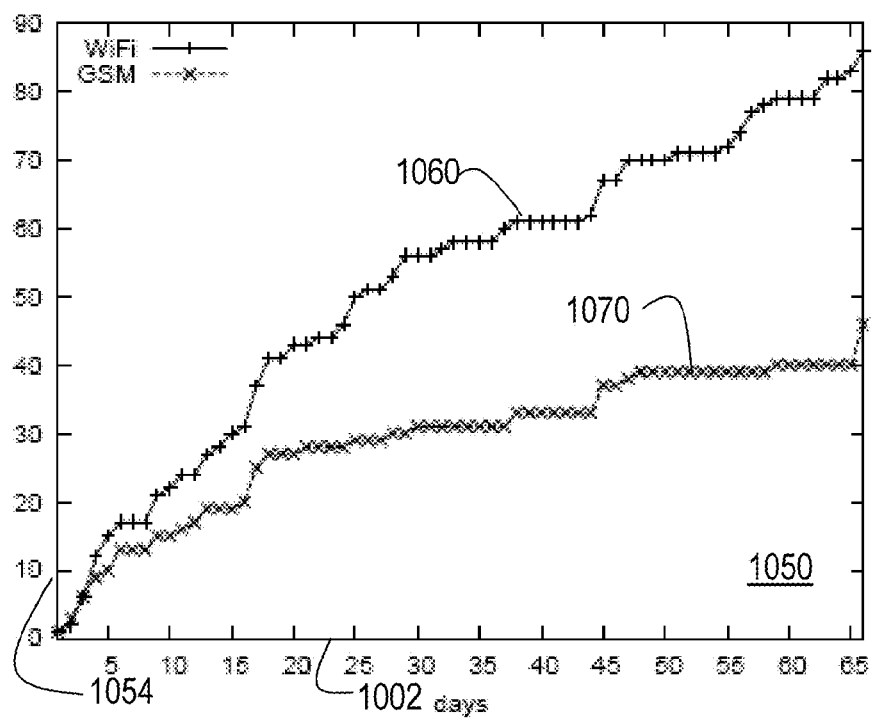
FIG. 10B is a graph of number of stationary states for a mobile terminal accumulated incrementally over time, according to one embodiment.

FIG. 10B is a graph 1050 of number of stationary states for a mobile terminal accumulated incrementally over time, according to one embodiment. The horizontal axis 1002 is time in days, as in FIG. 10A. The vertical axis 1054 is number Z of stationary states. Trace 1060 depicts the growth in stationary states based on the WiFi data stream for User 1; and trace 1070 depicts the growth in stationary states based on the GSM data stream for User 1. Graph 1050 clearly demonstrates that the stationary state update process of incremental state learning module 226 can incrementally discover new stationary states as data arrives. Note that the number of WiFi stationary states is larger than the number of GSM stationary states. This is also expected since many places nowadays have free WiFi access, but many of these access points might be under the same GSM cell. In Table 6, the total numbers of the stationary states discovered by all 3 users are summarized.

TABLE 6

Total number of stationary states.

| Data Stream Type | User 1 | User 2 | User 3 |
|---|---|---|---|
| GSM | 46 | 95 | 58 |
| WiFi | 86 | 109 | 83 |

Figure 11A:
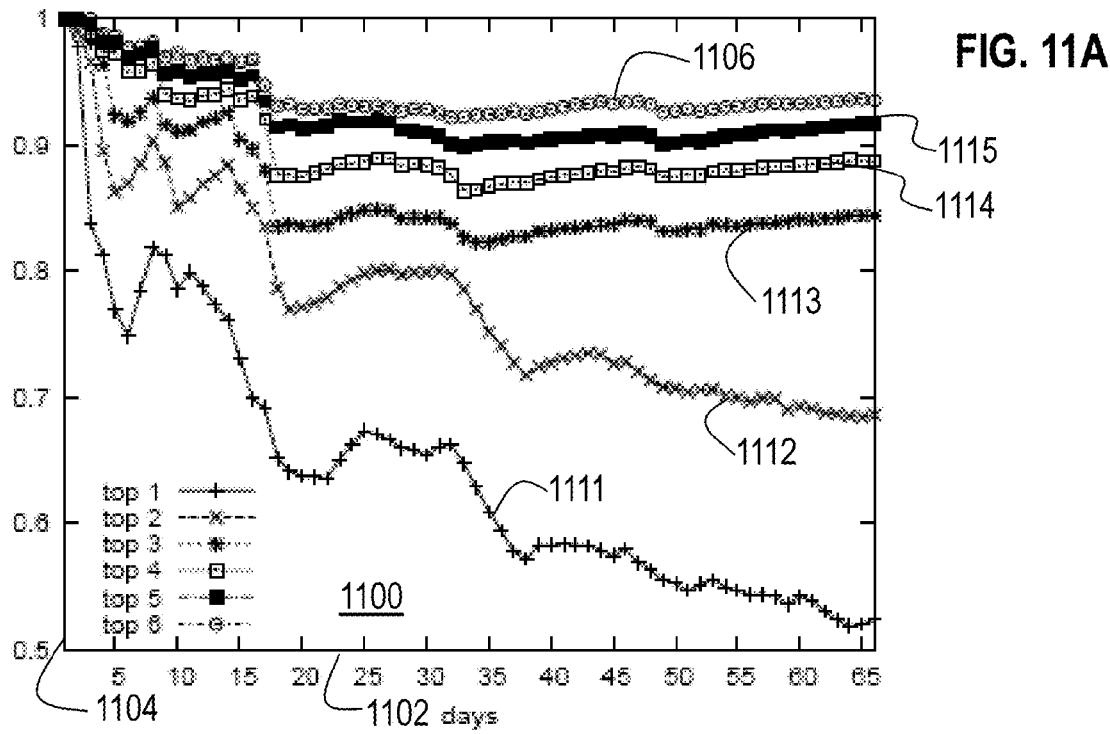
FIG. 11A and FIG. 11B are graphs of cumulative distribution function of most frequent stationary states for a mobile terminal accumulated incrementally over time for GSM cells and WiFi access points, respectively, according to some embodiments.
Figure 11B:
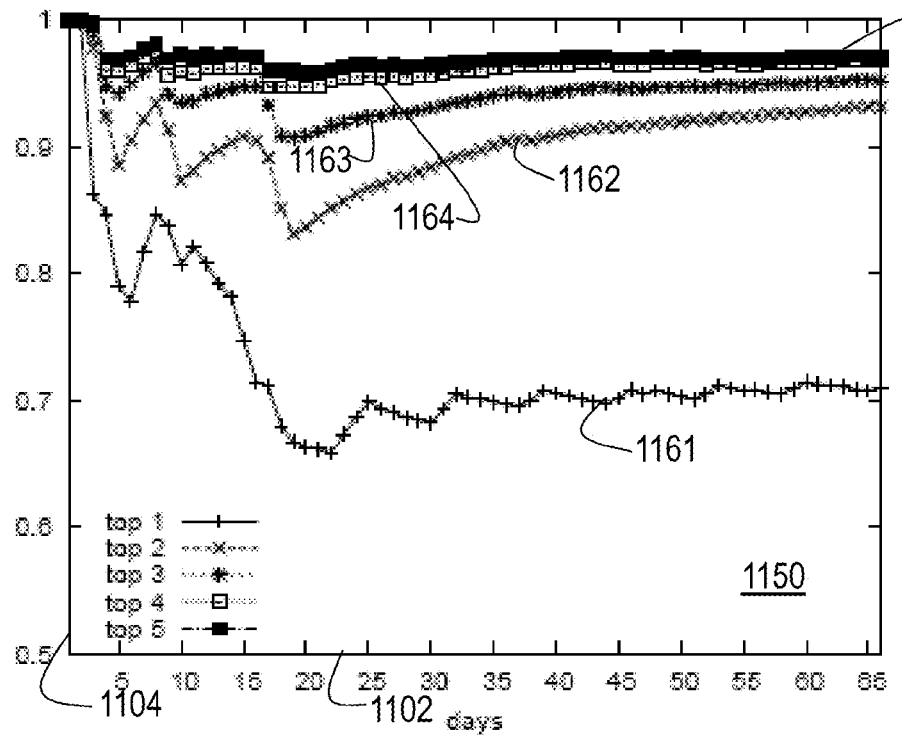

FIG. 11A and FIG. 11B are graphs 1100 and 1150 of cumulative distribution functions of most frequent stationary states for a mobile terminal accumulated incrementally over time for GSM cells and WiFi access points, respectively, according to some embodiments. The horizontal axis 1102 is time in days. The vertical axis 1104 is fraction of total observations that are attributable to the sum of a given stationary state and all more frequent states. In graph 1100 for the User 1 GSM data stream, trace 1111 depicts the fraction of observations attributed to the first state, trace 1112 to the first and second most frequent stationary states, trace 11B to the first through third most frequent stationary states, trace 1114 to the first through fourth most frequent stationary states, trace 1115 to the first through fifth most frequent stationary states, and trace 1116 to the first through sixth most frequent stationary states. The difference between traces gives the fraction attributable to the additional stationary state. In graph 1150 for the User 1 WiFi data stream, trace 1151 depicts the fraction of observations attributed to the first state, trace 1152 to the first and second most frequent stationary states, trace 1153 to the first through third most frequent stationary states, trace 1154 to the first through fourth most frequent stationary states, trace 1155 to the first through fifth most frequent stationary states. These graphs show how the stationary states are distributed in frequency of occurrence. Each of the GSM and WiFi graphs show a big stationary state that consistently has more than 50% of the probability. After going through the states manually, this state clearly corresponds to the Home state. The top-5 for WiFi and top-6 for GSM consistently account for more than 95% of the time in each day. These states correspond clearly to Work, and other frequently visited places.

HMM and LDA learners are not incremental learners. To provide a favorable comparison for these alternative approaches, the HMM and LDA are trained with the full two months of data, even though such results would not be available for 66 days. Another difficult question is how to decide the number of clusters for the HMM and LDA approaches. There are different heuristics proposed in the literature. Here, a very good estimate is provided by utilizing the results from iLoc. The number of clusters for HMM and LDA is based on the top stationary states that cover 95% of the stationary time of a user. The assumption is that, if either HMM or LDA will outperform iLoc, that outperforming model should discover a similar set of stationary states. Table 7 shows the number of clusters to account for 95% of stationary time for different users from iLoc. Furthermore, to apply HMM and LDA effectively, the number of iterations also is determined. For HMM, the maximum number of iterations is set to be 100. For LDA, a Gibbs sampler approach to training the LDA model is used. The number of the iterations for the Gibbs sampler is set to be 500.

TABLE 7

Number of stationary states to account for 95% of stationary time.

| Data Stream Type | User 1 | User 2 | User 3 |
|---|---|---|---|
| GSM | 6 | 23 | 10 |
| WiFi | 5 | 24 | 12 |

Figure 12A:
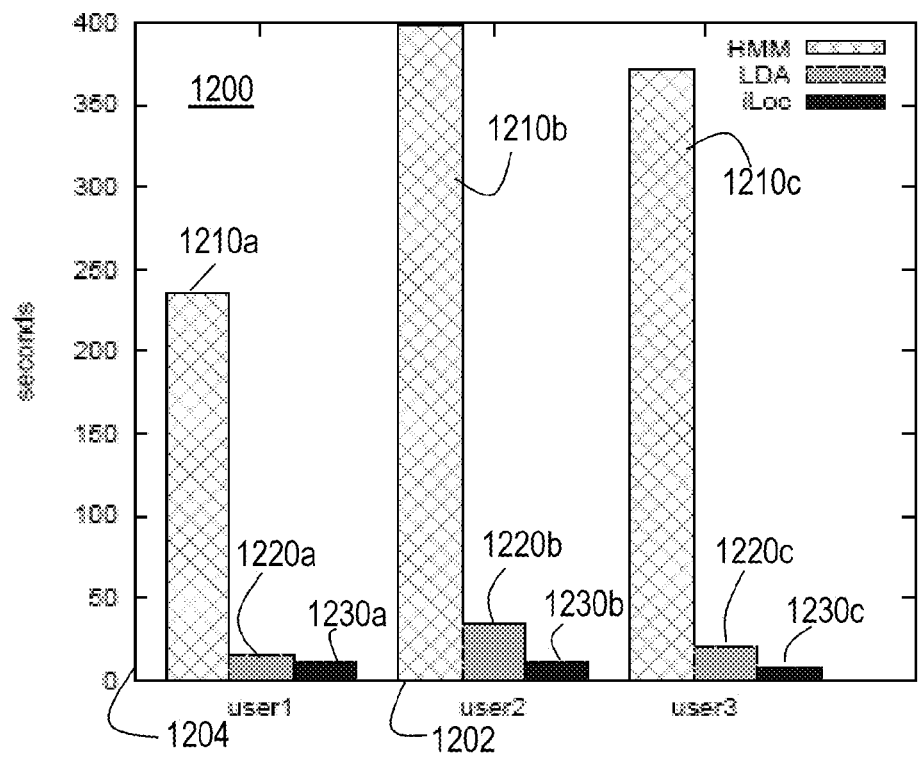
FIG. 12A and FIG. 12B are graphs of time to build probability models of transition states compared to other approaches, for GSM cells and WiFi access points, respectively, according to some embodiments.
Figure 12B:
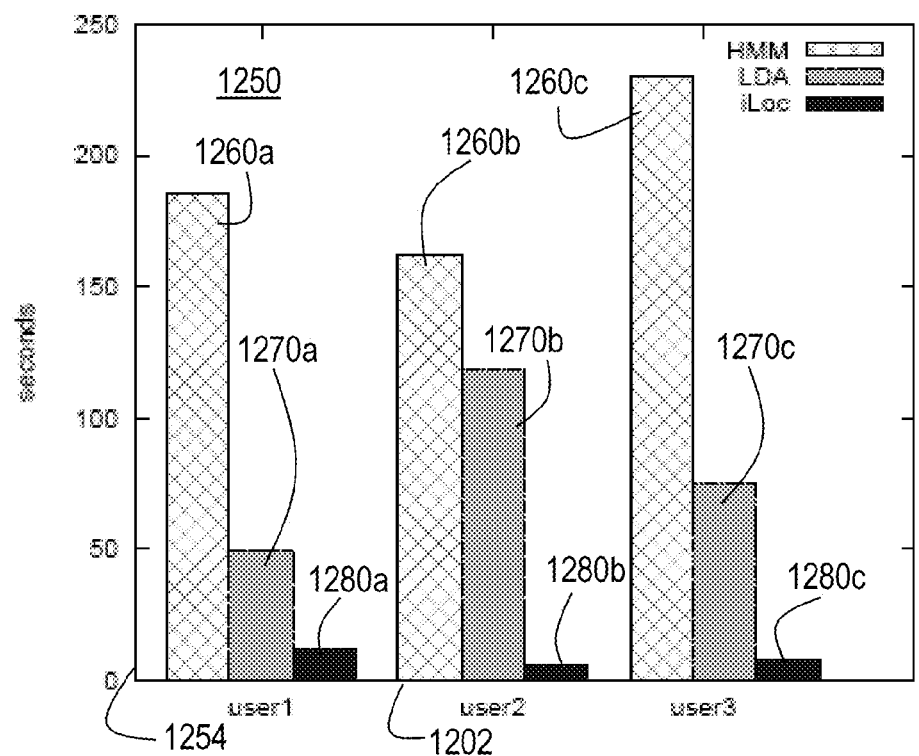
Figure 13A:
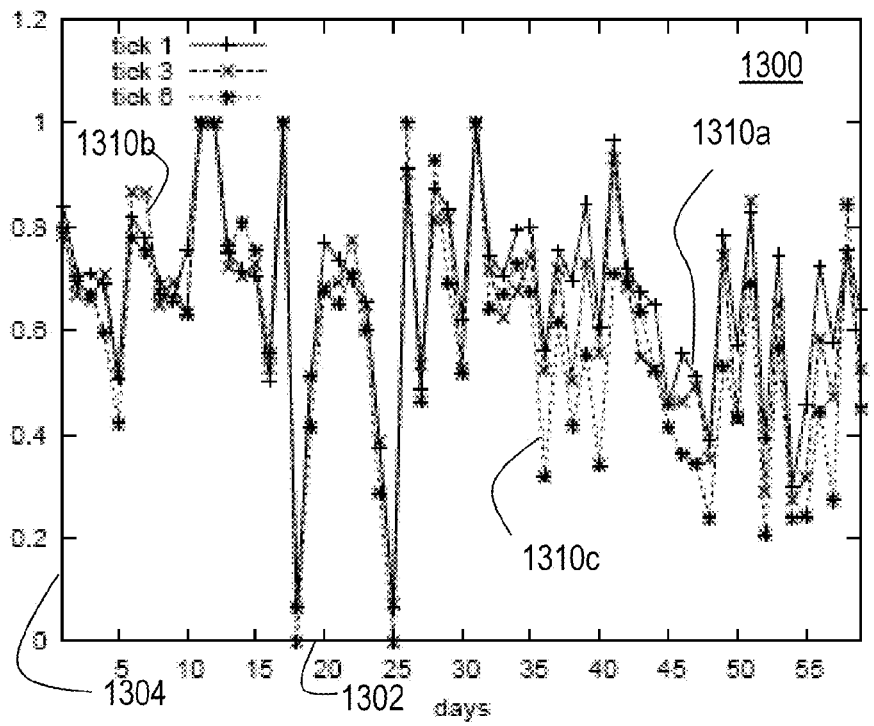
FIG. 13A through FIG. 13D are graphs of prediction accuracy for moving and non-moving transition states for GSM cells and WiFi access points, respectively, according to some embodiments.
Figure 13B:
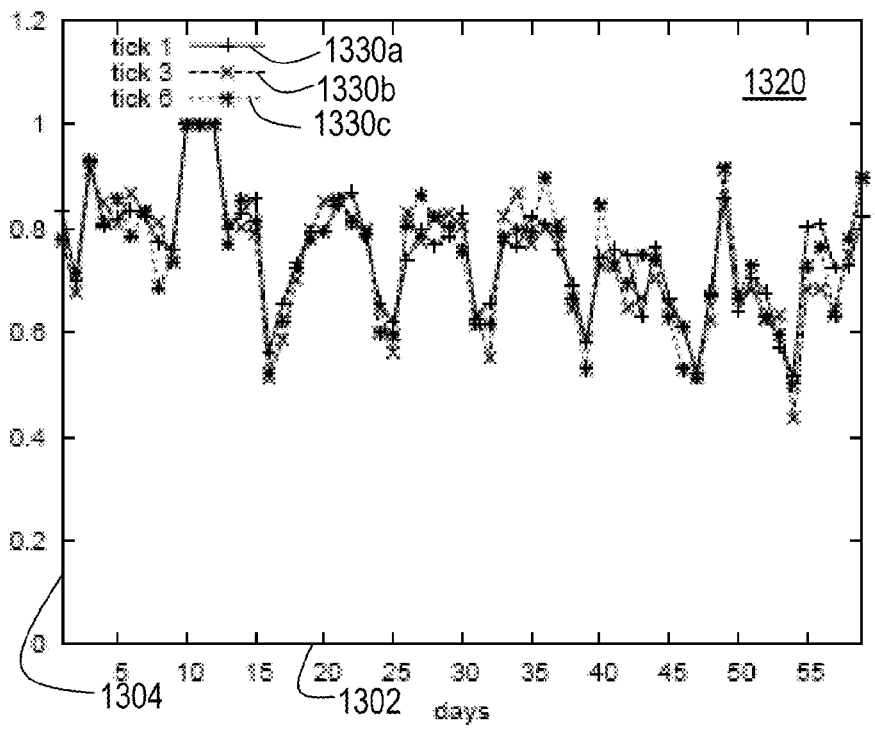
Figure 13C:
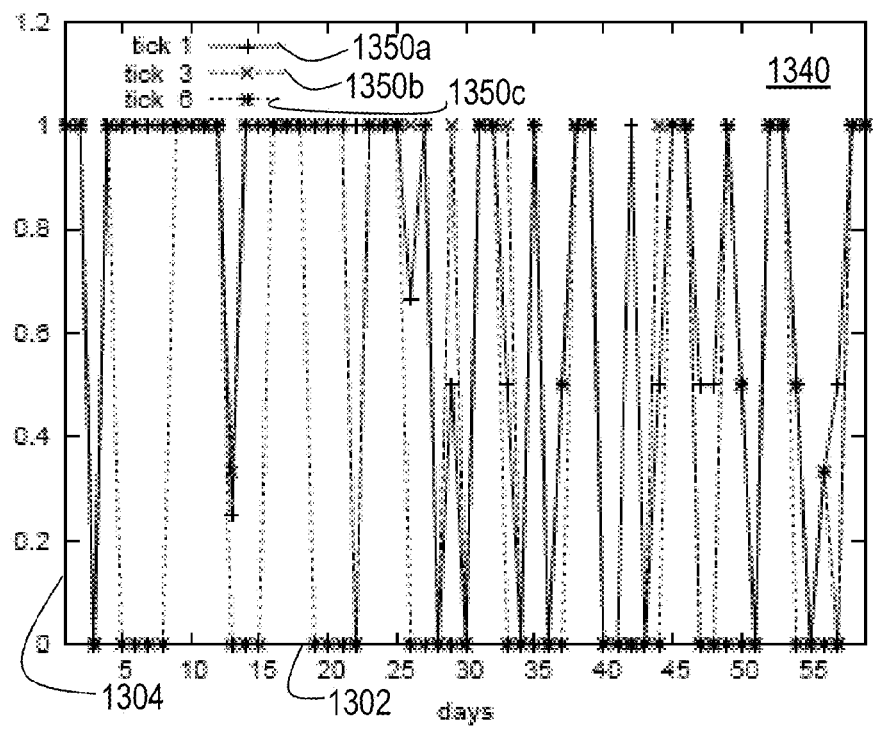
Figure 13D:
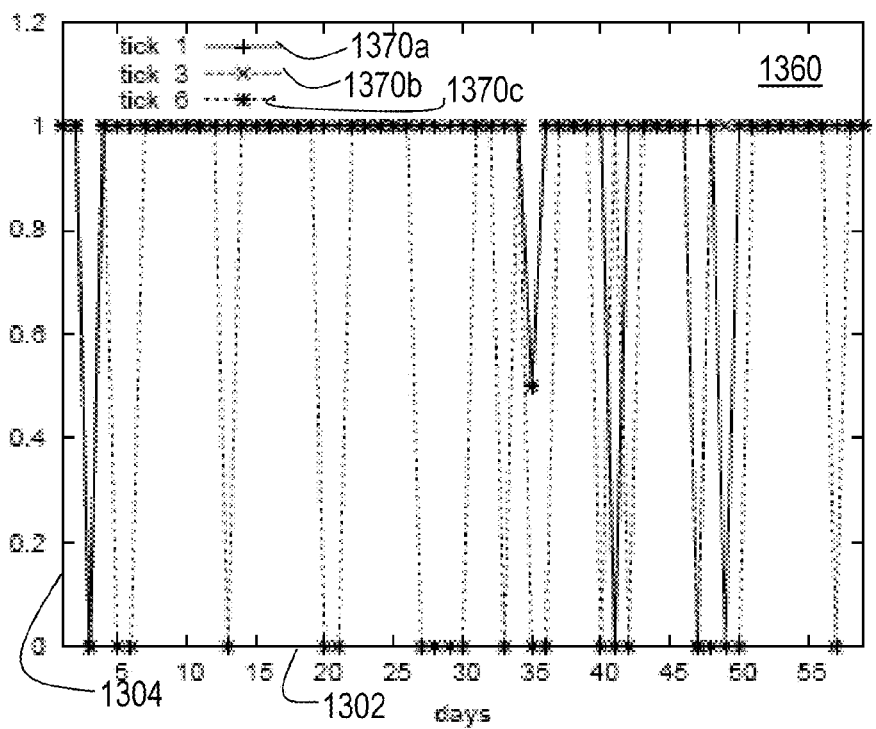

FIG. 12A and FIG. 12B are graphs 1200 and 1250 of time to build probability models of transition states compared to other approaches, for GSM cells and WiFi access points, respectively, according to some embodiments. The horizontal axis 1202 indicates bins for the user and modeling approach. The vertical axes 1204 and 1254 indicate the time in seconds. The model build time for GSM data stream is shown in graph 1200 for the HMM approach for each of the three users as bars 1210a, 1210b and 1210c, collectively referenced hereinafter as bars 1210; for the LDA approach as bars 1220a, 1220b and 1220c, collectively referenced hereinafter as bars 1220; for the iLoc embodiments as bars 1230a, 1230b and 1230c, collectively referenced hereinafter as bars 1230. The model build time for WiFi data stream is shown in graph 1250 for the HMM approach for each of the three users as bars 1260a, 1260b and 1260c, collectively referenced hereinafter as bars 1260; for the LDA approach as bars 1270a, 1270b and 1270c, collectively referenced hereinafter as bars 1270; for the iLoc embodiments as bars 1280a, 1280b and 1280c, collectively referenced hereinafter as bars 1280. Even with only 100 iterations, HMM takes the longest time (bars 1210 and 1260) to train. This also shows that iLoc (bars 1230 and 1280) is about 2 to 10 times faster than LDA with Gibbs sampling (bars 1220 and 1270). The performance gain is mainly because iLoc is an one-pass algorithm, and others require multiple iterations over the data.

The quality of clusters from different approaches was also examined. For User 1 the top-5 clusters (WiFi data stream) are compared to those from HMM and LDA in Table 8, which shows the top-3 WiFi access point IDs from each learning approach. To the user, these access point IDs can be easily associated with some semantic meaning. In Table 9, the user tags these clusters based on the top ten WiFi IDs. For iLoc, the user is able to identify and distinguish several interesting places, including home, work and a friend's home. Also, iLoc correctly clusters the WiFi access point IDs near the user's usual lunch and Gym locations. Table 9 also shows the prior probabilities (support) of each cluster, which represents the degree of importance of each cluster. The user agrees with the iLoc clusters associated with stationary sates. However, HMM and LDA cannot clearly separate these stationary states. For example, the WiFi ID "Home" appears in a few clusters. If these HMM and LDA clusters were selected as stationary states, the transitional model is severely affected, leading to poor prediction performance. Similar clustering behaviors are observed for the other two users.

TABLE 8

Top three WiFi IDs (SSIDs) for stationary states by various approaches.

| Approach | State1 | State2 | State3 | State4 | State5 |
|---|---|---|---|---|---|
| iLoc | YY Home, Disha, Dua | WANO Kelevala noklabwl | HotelWireless Multi-Point Access SEASONS_INN | Aquarium linksys, Arthur | Glenbrook Homelinksys Kwan AP |
| HMM, | YY Home, Disha, HotelWireless | Kelevala, WANO, noklabwl | YY Home, HotelWireless, Dua | Aquarium, dungeon, Due Net | Aquarium Dungeon WANO |
| LDA | WANO, Kelevala, noklabwl | YY Home, Disha, Gammavista | Disha, YY Home, Dua | Lee9, YY Home, Gamavista | YY Home Dua Disha |

TABLE 9

Location context for stationary states by various approaches.

| Approach | State1 | State2 | State3 | State4 | State5 |
|---|---|---|---|---|---|
| iLoc | Home (71%) | Work (22%) | Lunch (2%) | Friend Home (1.5%) | Gym (0.3%) |
| HMM, | Home (49%) | Work (26%) | Home (18%) | Friend Home, Work (6%) | Friend Home, Work (1%) |
| LDA | Work (24%) | Home (19%) | Home (19%) | Home (19%) | Home (19%) |

TABLE 10

Prediction request (query) load during experiments.

| | User 1 | | User 2 | | User 3 | |
|---|---|---|---|---|---|---|
| Type | Qt1 | Qt2 | Qt1 | Qt2 | Qt1 | Qt2 |
| GSM | 7,973 | 272 | 4,832 | 142 | 5,292 | 102 |
| WiFi | 7,058 | 359 | 4,409 | 181 | 5,307 | 124 |

These two query types cover many use cases. A non-moving query essentially asks how long a user will be staying in the same stationary state, and a moving query asks if a user is about to transit and to which stationary state. If iLoc can consistently provide accurate prediction for both queries, it To fully test out the transitional model and the prediction framework, a continuous set of prediction queries was formed automatically. In this setting, the inputs from a data stream were replayed sequentially. At each sampling point, the movement detection process is invoked and two types of queries are formed. The first query type is called non-moving query (and labeled Qt1), such that if a user is not moving, a query of 60 minutes time range was made. The prediction module output a most probable transition state every 10 minutes until the user started to move again or the 60 minutes prediction window elapsed. The accuracy was computed at each time tick by comparing the predicted transitional state s against the stationary state z0. A prediction was considered correct if s represents the self-transition s=(z0-z0). The second query type is called moving query (and labeled Qt2), such that if the user was on the move, starting from the most recent stationary state z0, a time range was formed that lasts until the user reaches another stationary state z1. During this time range, s was predicted every 10 minutes. The accuracy was measured at each time tick by comparing the predicted transitional state s against the correct transition between two stationary states z0-z1. Table 10 shows the query load for both types of queries.

can be utilized for many real-life applications (e.g., Ad-serving). Although the illustrated embodiments are fully incremental models, statistics are assembled over several days to populate the posterior probabilities. The predictions were performed continuously on exactly two months of data. For the predictions, if a predictor refuses to make a prediction, the predictor is considered to not have sufficient information to make the prediction, and it is not part of the query load. This is reasonable since the goal is to have very accurate predictions rather than very broad predictions. To gain some insights to the prediction process, daily prediction for User 1 were examined. If there's no predictions made for a day, it is treated as correct choice (i.e., 100% correct for the day).

FIG. 13A through FIG. 13D are graphs 1300, 1320, 1340 and 1360 of prediction accuracy for moving and non-moving transition states for GSM cells and WiFi access points, respectively, according to some embodiments. The horizontal axis 1302 is time in days. The vertical axis 1304 indicates the correct prediction rate (1=100% correct prediction) for each day at three different time ranges of 10 minutes per tick: 1 tick (10 minutes), 3 ticks (30 minutes) and 6 ticks (60 minutes). Graph 1300 depicts tick 1 predictions as trace 1310a, tick 2 predictions as trace 1310b and tick 6 predictions as trace 1310c for Qt1 queries of User 1 based on GSM data stream. Graph 1320 depicts tick 1 predictions as trace 1330a, tick 2 predictions as trace 1330b and tick 6 predictions as trace 1330c for Qt1 queries of User 1 based on WiFi data stream. Graph 1340 depicts tick 1 predictions as trace 1350a, tick 2 predictions as trace 1350b and tick 6 predictions as trace 1350c for Qt2 queries of User 1 based on GSM data stream. Graph 1360 depicts tick 1 predictions as trace 1370a, tick 2 predictions as trace 1370b and tick 6 predictions as trace 1370c for Qt2 queries of User 1 based on WiFi data stream.

Predictions based on a GSM data stream were not as good as those based on a WiFi data stream. The main reason is that GSM cells cover larger spatial regions. Qt1 predictions mainly test the self-transitions for different stationary states. The stationary states from a GSM data stream can sometimes mix-up different stationary states if they are nearby. As a result, the self-transition model for GSM is not as good as the one for WiFi. However, even for GSM, iLoc is still able to achieve 62% overall accuracy. For WiFi data stream, iLoc performs very well, and achieves 73% overall accuracy.

Some days, the accuracy of predictions for Qt2 queries shown in graph 1340 and 1360 is not very good (e.g., close to 0). After consulting with the users, it turns out that these days mostly are weekends and vacations. Predicting these days are challenging due to irregular movements. However, being able to differentiate these days from normal week days can improve the prediction accuracy for those days. The GSM predictions were again worse than WiFi predictions. Therefore, it is useful for the incremental state learning module stationary state update process to discover the stationary states accurately.

Compared with HMM and LDA in the next set of experiments, it became more evident that iLoc had superior performance. Overall, iLoc predictions based on the WiFi data stream was able to achieve 84% prediction accuracy, and GSM stream achieved 25%. Both GSM and WiFi based prediction modules made reasonable predictions for query time ranges up to an hour. This is sufficient for many application scenarios, for which predicting a user's behavior for the next hour is extremely helpful for satisfying the user's information cravings.

Table 11 shows the overall accuracy measures for all users under different approaches, and different parameter settings. The first row shows the accuracies of iLoc with the default parameters (from Table 4). Table 11 easily compares the performance of different approaches and different parameter settings. Table 11 has three parts. In the first part, the performance of iLoc is compared against HMM and LDA. Both HMM and LDA show low accuracies that are not suitable for this prediction task. LDA only provides clustering information, which can be used as stationary states. HMM requires observations to infer the hidden states, whereas at the query time instance, future observations are not available yet. Although HMM provides transitional probability distribution for different states, these transitions are mostly for self-transitions. The Viterbi algorithm will always end up with the same state. To illustrate this, Table 12 shows the transition matrix from a HMM model. From the matrix itself, some transitions other than self-transition can be observed. For instance, state1 is able to transit to state3 with 63% of probability. However, given the semantic meaning of the states shown in Table 9, they are essentially the same state. Similar conclusions can be drawn for other transitions. Therefore, to have a fair comparison, only the cluster/stationary states from LDA and HMM are included. As can be observed from the results, especially for the query type Qt2, there are some predictions for HMM and LDA. However, the accuracy is still far behind the iLoc with default parameters (iLoc-default). This can also be observed from the average accuracy for the corresponding method listed below the approach name. For this set of experiments, since the full set of data is used to train HMM and LDA, any incremental learning methods for HMM and LDA cannot outperform the results shown for iLoc. Furthermore, being able to easily plug-in different clustering methods, iLoc is more flexible and open.

TABLE 11

Prediction accuracies for different approaches and settings.

| Approach | User 1 | | | | User 2 | | | | User 3 | | | |
|---|---|---|---|---|---|---|---|---|---|---|---|---|
| | Qt1 | | Qt2 | | Qt1 | | Qt2 | | Qt1 | | Qt2 | |
| average | GSM | WiFi | GSM | WiFi | GSM | WiFi | GSM | WiFi | GSM | WiFi | GSM | WiFi |
| iLoc (def) 61% | 62% | 73% | 25% | 84% | 62% | 64% | 26% | 44% | 71% | 79% | 68% | 81% |
| LDA 37% | 49% | 72% | 18% | 22% | 55% | 71% | 6% | 2% | 61% | 68% | 5% | 11% |
| HMM 39% | 42% | 66% | 42% | 21% | 46% | 64% | 20% | 8% | 58% | 73% | 2% | 21% |
| iLoc-0 47% | 59% | 65% | 9% | 42% | 61% | 67% | 6% | 25% | 70% | 74% | 42% | 41% |
| iLoc-2 67% | 68% | 72% | 27% | 90% | 61% | 63% | 35% | 50% | 73% | 79% | 94% | 91% |
| iLoc-5 70% | 59% | 73% | 58% | 95% | 48% | 60% | 52% | 72% | 68% | 79% | 81% | 93% |
| iLoc-none 45% | 68% | 76% | 10% | 16% | 66% | 66% | 13% | 35% | 83% | 84% | 8% | 10% |
| iLoc-man 60% | 62% | 72% | 25% | 86% | 60% | 63% | 24% | 40% | 66% | 69% | 66% | 81% |

TABLE 12

HMM State transition matrix based on Wifi data stream

| | State1 | State2 | State3 | State4 | State5 |
|---|---|---|---|---|---|
| State1 | 37% | 0% | 63% | 0% | 0% |
| State2 | 0% | 99% | 0.90% | 0.10% | 0% |
| State3 | 82% | 10% | 1% | 7% | 0% |
| State4 | 0% | 0.50% | 0.50% | 36% | 63% |
| State5 | 0% | 0% | 0% | 56% | 44% |

The second part of the Table 11 shows the accuracy of iLoc when the min-support parameter value is varied. Four settings (0%, 1% default, 2% and 5%) are tested, which are labeled iLoc-0, iLoc-default, iLoc-2, and iLoc-5. The higher the min-support, the fewer stationary states are considered in the transition states, and generally the greater the prediction accuracy. The price for the greater accuracy is not being able to predict some infrequent movements.

Figure 14A:
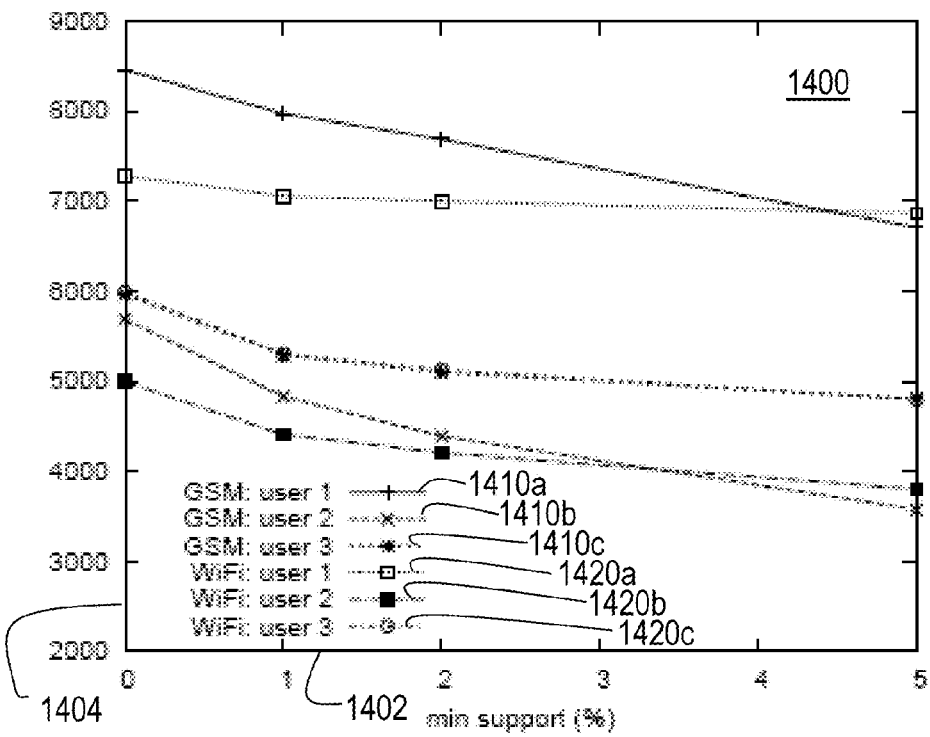
FIG. 14A and FIG. 14B are graphs of number of predictions made for different minimum thresholds for probability of occurrence of a stationary state (called min support), according to some embodiments.
Figure 14B:
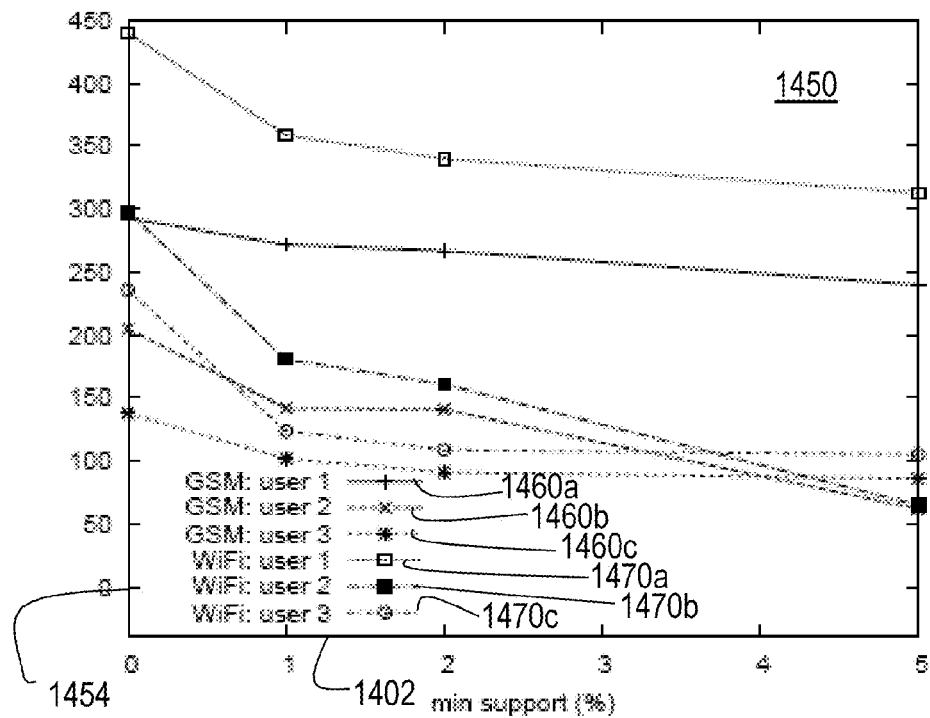

FIG. 14A and FIG. 14B are graphs 1400 and 1450 of number of predictions made for different minimum thresholds for probability of occurrence of a stationary state (called min support), according to some embodiments. The horizontal axis 1402 is minimum support in percent (%). The vertical axis 1402 is number of Qt1 queries allowed; and the vertical axis 1454 is number of Qt2 queries allowed. Graph 1400 depicts Qt1 queries for User 1 as trace 1410a, User 2 as trace 1410b and User 3 as trace 1410c based on the GSM data stream. Graph 1400 also depicts Qt1 queries for User 1 as trace 1420a, User 2 as trace 1420b and User 3 as trace 1420c based on the WiFi data stream. Graph 1450 depicts Qt2 queries for User 1 as trace 1460a, User 2 as trace 1460b and User 3 as trace 1460c based on the GSM data stream. Graph 1450 also depicts Qt2 queries for User 1 as trace 1470a, User 2 as trace 1470b and User 3 as trace 1470c based on the WiFi data stream.

As shown in FIG. 14A and FIG. 14B, as min-support increases, the number of the queries that can be answered decreases monotonically. At min-support 0%, iLoc can answer a maximum number of queries both for Qt1 and Qt2; however, with the worst accuracy. For Qt1, with min-support at 1%, iLoc is still able to answer a large portion of queries with good gain in accuracy. For Qt2, at 1% min-support, the number of queries dropped can be large for some settings. However, the accuracy gain is dramatic. As min-support keeps increasing (e.g., iLoc-2, and iLoc-5), the number of queries dropped also increases. The accuracy gain is only moderate (6% to 9% overall improvements). Therefore, to reach the right balance, a min-support value of 1% was chosen as the default.

The third part of Table 11 shows the effect of the temporal features. The iLoc-none embodiment uses no temporal features. The iLoc-none performs badly for Qt2 queries. This is expected since iLoc-none does not differentiate movements in different time contexts. When morning, afternoon and night temporal features are added (labeled iLoc-man), the performance improves drastically. The performance is further enhanced with the full feature set (labeled iLoc-default).

Figure 15:
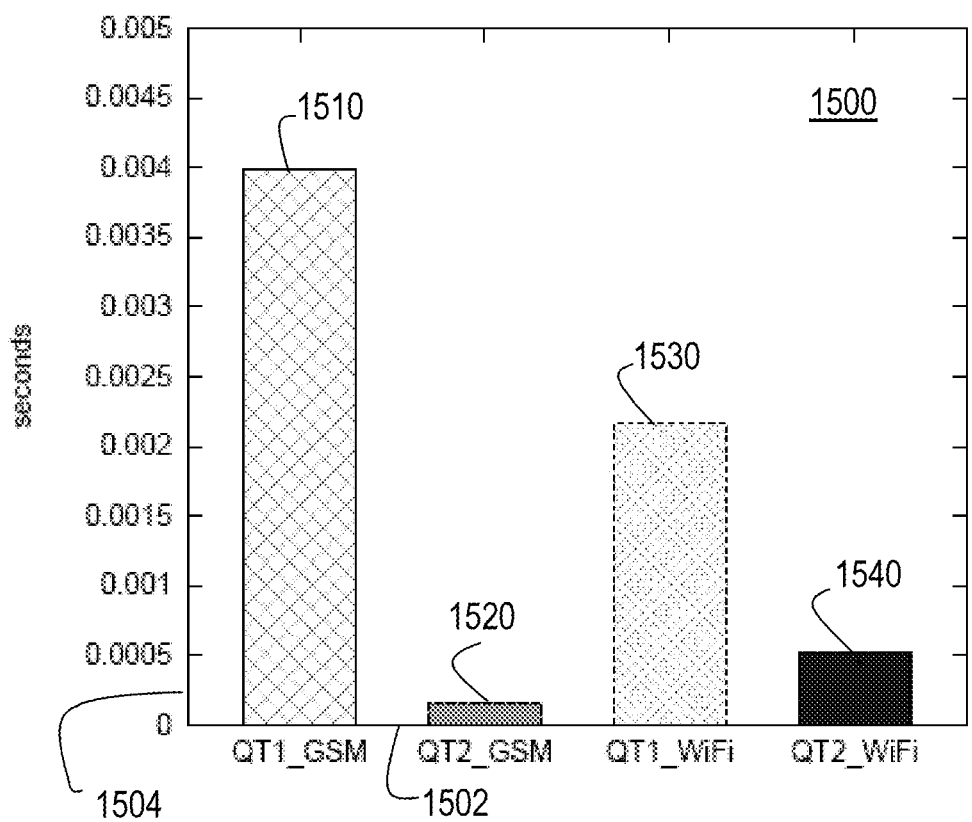
FIG. 15 is a graph of average time to make a prediction for moving and non-moving mobile terminals for GSM cells and WiFi access points, according to some embodiments.

FIG. 15 is a graph 1500 of average execution time to make a prediction for moving and non-moving mobile terminals for GSM cells and WiFi access points, according to some embodiments. The horizontal axis 1502 indicates bins for the query and signal data stream. The vertical axis 1504 indicates the execution time in seconds. Bar 1510 indicates the execution time for Qt1 queries based on a GSM data stream. Bar 1520 indicates the execution time for Qt2 queries based on a GSM data stream. Bar 1530 indicates the execution time for Qt1 queries based on a WiFi data stream. Bar 1540 indicates the execution time for Qt2 queries based on a WiFi data stream. Most of the queries complete within 5 milliseconds. With this speed, iLoc can scale nicely as a web service for many thousands of users.

The iLoc framework is an open framework. The illustrated embodiments work well for the mobile signal environment. In other embodiments more sensor inputs are incorporated, such as accelerometer sensor data to differentiate finer grain movements. In some embodiments, signal strength is incorporated to help identify smaller stationary states.

The iLoc learning framework captures spatial and temporal dimensions, and is able to accurately forecast a user's future locations in a fully automatic and incremental fashion. Recommendation systems based on iLoc can accurately push relevant information based on the predicted location information. For instance, a system can automatically fetch relevant traffic information and prepare routing information when a user is about to transit to another stationary state (e.g., from work to home) without any command from the user. Alternatively, a system can smartly push advertisements that are related to different stationary states (e.g., push lunch coupons when a user is about to go to lunch). In order to generate values for millions of users, a system should be able to scale linearly with the amount of information received. It has been shown that iLoc is able to satisfy this requirement due to its incremental signal data stream processing modules. The efficiency of building and storing different user states has been shown empirically.

Hardware Descriptions

The processes described herein for incrementally determining location context may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
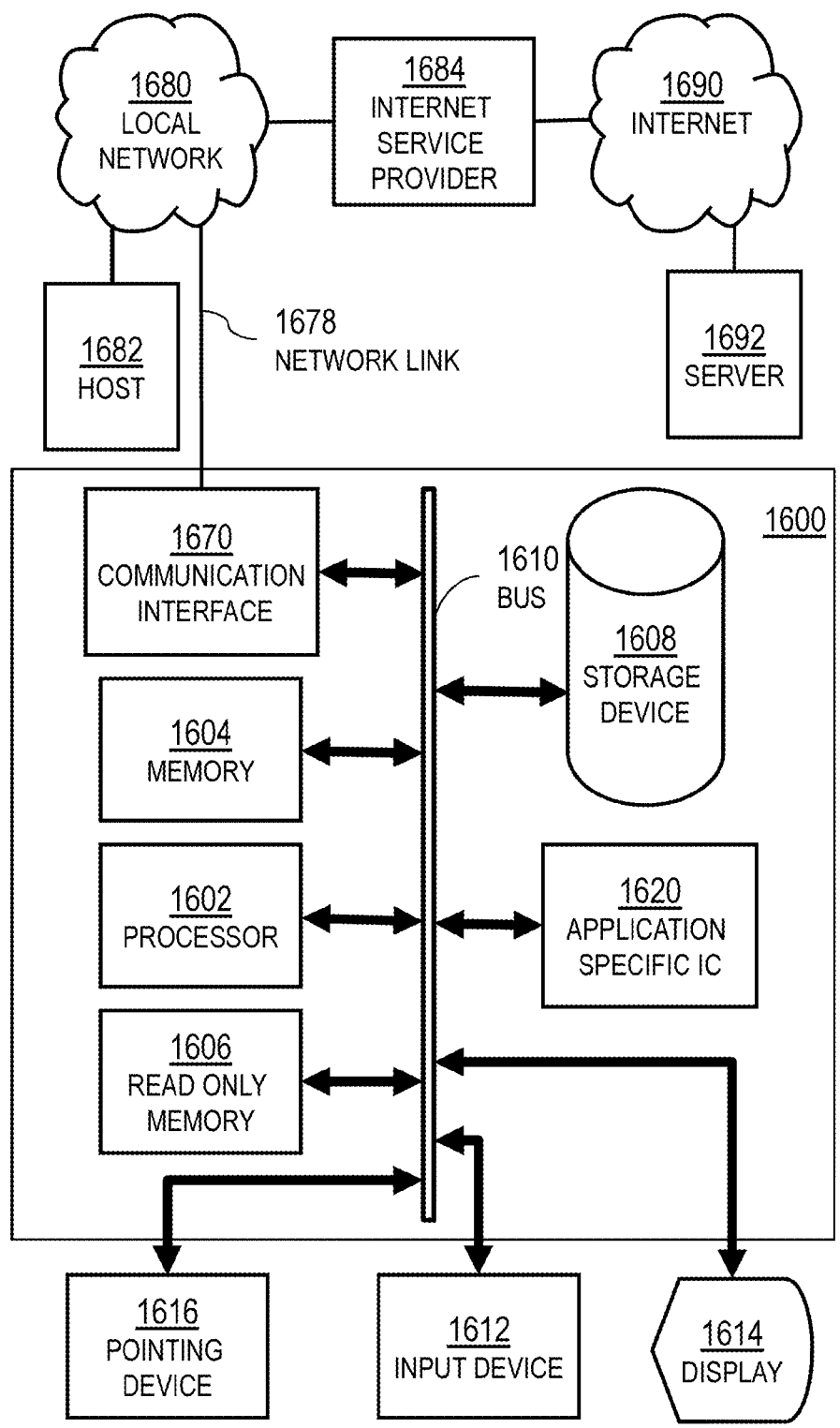
FIG. 16 is a diagram of hardware that can be used to implement an embodiment of the invention.

FIG. 16 illustrates a computer system 1600 upon which an embodiment of the invention may be implemented. Although computer system 1600 is depicted with respect to a particular device or equipment, it is contemplated that other devices or equipment (e.g., network elements, servers, etc.) within FIG. 16 can deploy the illustrated hardware and components of system 1600. Computer system 1600 is programmed (e.g., via computer program code or instructions) to incrementally determine location context as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1600, or a portion thereof, constitutes a means for performing one or more steps of incrementally determining location context.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to incrementally determining location context. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for incrementally determining location context. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for incrementally determining location context, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 105 for obtaining signal data streams from the UE 101.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1620.

Network link 1678 typically provides information communication using transmission media through one or more networks to other devices that use or process the information. For example, network link 1678 may provide a connection through local network 1680 to a host computer 1682 or to equipment 1684 operated by an Internet Service Provider (ISP). ISP equipment 1684 in turn provides data communication services through the public, world-wide packet-switching communication network of networks now commonly referred to as the Internet 1690.

A computer called a server host 1692 connected to the Internet hosts a process that provides a service in response to information received over the Internet. For example, server host 1692 hosts a process that provides information representing video data for presentation at display 1614. It is contemplated that the components of system 1600 can be deployed in various configurations within other computer systems, e.g., host 1682 and server 1692.

At least some embodiments of the invention are related to the use of computer system 1600 for implementing some or all of the techniques described herein. According to one embodiment of the invention, those techniques are performed by computer system 1600 in response to processor 1602 executing one or more sequences of one or more processor instructions contained in memory 1604. Such instructions, also called computer instructions, software and program code, may be read into memory 1604 from another computer-readable medium such as storage device 1608 or network link 1678. Execution of the sequences of instructions contained in memory 1604 causes processor 1602 to perform one or more of the method steps described herein. In alternative embodiments, hardware, such as ASIC 1620, may be used in place of or in combination with software to implement the invention. Thus, embodiments of the invention are not limited to any specific combination of hardware and software, unless otherwise explicitly stated herein.

The signals transmitted over network link 1678 and other networks through communications interface 1670, carry information to and from computer system 1600. Computer system 1600 can send and receive information, including program code, through the networks 1680, 1690 among others, through network link 1678 and communications interface 1670. In an example using the Internet 1690, a server host 1692 transmits program code for a particular application, requested by a message sent from computer 1600, through Internet 1690, ISP equipment 1684, local network 1680 and communications interface 1670. The received code may be executed by processor 1602 as it is received, or may be stored in memory 1604 or in storage device 1608 or other non-volatile storage for later execution, or both. In this manner, computer system 1600 may obtain application program code in the form of signals on a carrier wave.

Various forms of computer readable media may be involved in carrying one or more sequence of instructions or data or both to processor 1602 for execution. For example, instructions and data may initially be carried on a magnetic disk of a remote computer such as host 1682. The remote computer loads the instructions and data into its dynamic memory and sends the instructions and data over a telephone line using a modem. A modem local to the computer system 1600 receives the instructions and data on a telephone line and uses an infra-red transmitter to convert the instructions and data to a signal on an infra-red carrier wave serving as the network link 1678. An infrared detector serving as communications interface 1670 receives the instructions and data carried in the infrared signal and places information representing the instructions and data onto bus 1610. Bus 1610 carries the information to memory 1604 from which processor 1602 retrieves and executes the instructions using some of the data sent with the instructions. The instructions and data received in memory 1604 may optionally be stored on storage device 1608, either before or after execution by the processor 1602.

Figure 17:
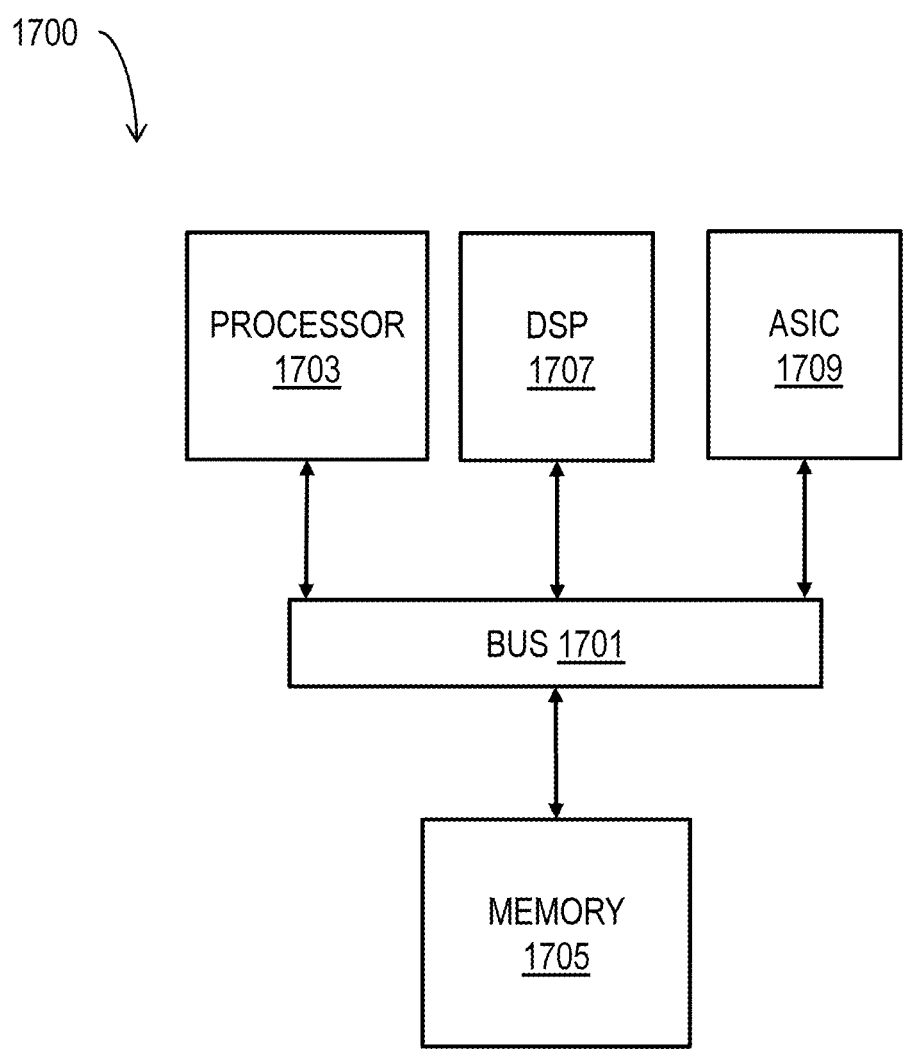
FIG. 17 is a diagram of a chip set that can be used to implement an embodiment of the invention.

FIG. 17 illustrates a chip set 1700 upon which an embodiment of the invention may be implemented. Chip set 1700 is programmed to incrementally determine location context as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1700, or a portion thereof, constitutes a means for performing one or more steps of incrementally determining location context.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to incrementally determine location context. The memory 1705 also stores the data associated with or generated by the execution of the inventive steps.

Figure 18:
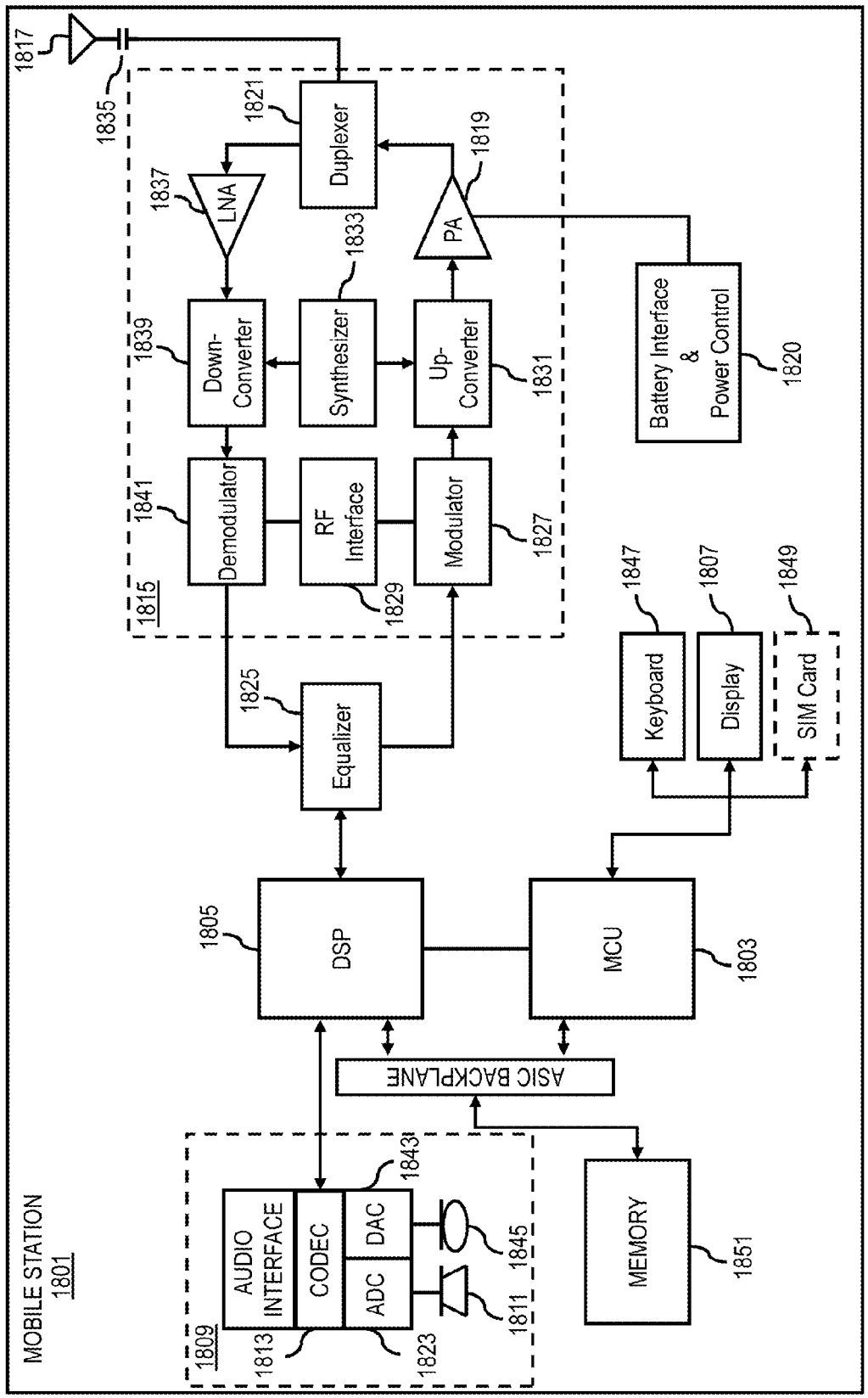
FIG. 18 is a diagram of a mobile terminal (e.g., handset) that can be used to implement an embodiment of the invention.

FIG. 18 is a diagram of exemplary components of a mobile terminal (e.g., handset) for communications, which is capable of operating in the system of FIG. 1, according to one embodiment. In some embodiments, mobile terminal 1800, or a portion thereof, constitutes a means for performing one or more steps of incrementally determining location context. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application, the term "circuitry" would also cover an implementation of merely a processor (or multiple processors) and its (or their) accompanying software/or firmware. The term "circuitry" would also cover, for example, a baseband integrated circuit or applications processor integrated circuit in a mobile phone or a similar integrated circuit in a cellular network device or other network devices.

Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile terminal functions that perform or support the steps of incrementally determining location context. The display unit 1807 includes display circuitry configured to display at least a portion of a user interface of the mobile terminal (e.g., mobile telephone). Additionally, the display unit 1807 and display circuitry are configured to facilitate user control of at least some functions of the mobile terminal. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile terminal 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile terminal 1801 to send user input or a signal data stream to incrementally determine location context. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the terminal. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile terminal 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable storage medium known in the art. The memory device 1851 may be, but not limited to, a single memory, CD, DVD, ROM, RAM, EEPROM, optical storage, or any other non-volatile storage medium capable of storing digital data.

An optionally incorporated SIM card 1849 carries, for instance, important information, such as the cellular phone number, the carrier supplying service, subscription details, and security information. The SIM card 1849 serves primarily to identify the mobile terminal 1801 on a radio network. The card 1849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

facilitating access to, including granting access rights for, a user interface configured to receive signal data that indicates a set of one or more distinct signal sources from which signals are received at a mobile device for each of a plurality of different times, and facilitating access to, including granting access rights for, a user interface that delivers a service to the mobile device based on a stationary state associated with a set of one or more distinct signal sources at a time when the mobile device is determined to be not moving outside a specified area based on the signal data;

wherein delivering the service based on the stationary state further comprises delivering the service based on a transition state associated with a change from a first stationary state to a second stationary state, each stationary state associated with one or more similar sets of one or more distinct signal sources when the mobile device is not moving outside the specified area.

2. A method of claim 1, wherein the transition state is predicted based on a last stationary state before the current time and a time context for the current time and a history of occurrence of the transition state.

3. A method of claim 1, further comprising facilitating access to, including granting access rights for, a user interface configured to add annotations or labels to the transition or stationary state based, at least in part, on mining of user input.

4. A method of claim 1, wherein the first stationary state is identical to the second secondary state.

5. A method of claim 1, wherein the first and the second stationary states belong to a primary set of stationary states, wherein each stationary state in the primary set is associated with a frequently occurred one or more similar sets of one or more distinct signal sources when the mobile device is not moving outside the specified area.

6. A method of claim 1, wherein determining whether the mobile device is moving outside the specified area comprises determining whether a measure of similarity, between a first set of one or more distinct signal sources in a time window ending at the current time and a second set of one or more distinct signal sources in a time window ending at a time earlier than the current time, is below a movement threshold.

7. A method of claim 6, wherein the similarity measure is a cosine-based similarity measure between a first vector and a second vector representing the first and the second set of one more distinct signal sources, respectively.

8. A method of claim 1, wherein the distinct signal sources include one or more types among cellular base station, wireless access point, or global positioning system (GPS).

9. A method of claim 1, wherein delivering the service to the mobile device based on the stationary state is further based, at least in part, on a type of service based on communications by the user during the stationary state.

10. An apparatus comprising:
at least one processor; and
at least one memory including computer program code for one or more programs,
the at least one memory and the computer program code configured to, with the at least one processor, cause the apparatus to perform at least the following,
facilitate access to, including granting access rights for, a user interface configured to receive signal data that indicates a set of one or more distinct signal sources from which signals are received at a mobile device for each of a plurality of different times, and facilitate access to, including granting access rights for, a user interface that delivers a service to the mobile device based on a stationary state associated with a set of one or more distinct signal sources at a time when the mobile device is determined to be not moving outside a specified area based on the signal data;

wherein delivering a service based on the stationary state further comprises delivering the service based on a transition state associated with a change from a first stationary state to a second stationary state, each stationary state associated with one or more similar sets of one or more distinct signal sources when the mobile device is not moving outside the specified area.

11. An apparatus of claim 10, wherein the first and the second stationary states belong to a primary set of stationary states, wherein each stationary state in the primary set is associated with a frequently occurred one or more similar sets of one or more distinct signal sources when the mobile device is not moving outside the specified area.

12. An apparatus of claim 10, wherein determining whether the mobile device is moving outside the specified area comprises determining whether a measure of similarity, between a first set of one or more distinct signal sources in a time window ending at the current time and a second set of one or more distinct signal sources in a time window ending at a time earlier than the current time, is below a movement threshold.

13. An apparatus of claim 12, wherein the similarity measure is a cosine-based similarity measure between a first vector and a second vector representing the first and the second set of one more distinct signal sources, respectively.

14. An apparatus of claim 10, wherein the distinct signal sources include one or more types among cellular base station, wireless access point, or global positioning system (GPS).

15. An apparatus of claim 10, wherein delivering the service to the mobile device based on the stationary state is further based, at least in part, on a type of service based on communications by the user during the stationary state.

16. A non-transitory computer-readable storage medium carrying one or more sequences of one or more instructions which, when executed by one or more processors, cause an apparatus to at least perform:

facilitating access to, including granting access rights for, a user interface configured to receive signal data that indicates a set of one or more distinct signal sources from which signals are received at a mobile device for each of a plurality of different times, and facilitating access to, including granting access rights for, a user interface that delivers a service to the mobile device based on a stationary state associated with a set of one or more distinct signal sources at a time when the mobile device is determined to be not moving outside a specified area based on the signal data;

wherein delivering the service based on the stationary state further comprises delivering the service based on a transition state associated with a change from a first stationary state to a second stationary state, each stationary state associated with one or more similar sets of one or more distinct signal sources when the mobile device is not moving outside the specified area.

17. A non-transitory computer-readable storage medium of claim 16, wherein the transition state is predicted based on a last stationary state before the current time and a time context for the current time and a history of occurrence of the transition state.

* * * * *